US012606646B2

(12) United States Patent
Choi et al.

(10) Patent No.: US 12,606,646 B2
(45) Date of Patent: Apr. 21, 2026

(54) METHOD FOR PREPARING METALLOCENE SUPPORTED CATALYST

(71) Applicant: LG CHEM, LTD., Seoul (KR)

(72) Inventors: Jaehoon Choi, Daejeon (KR); Jung Won Lee, Daejeon (KR); Seungmi Lee, Daejeon (KR); Hyun Jee Kwon, Daejeon (KR); Cheolhwan Jeong, Daejeon (KR); Jonghyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 957 days.

(21) Appl. No.: 17/791,794

(22) PCT Filed: Nov. 30, 2021

(86) PCT No.: PCT/KR2021/017812

§ 371 (c)(1),
(2) Date: Jul. 8, 2022

(87) PCT Pub. No.: WO2022/114910

PCT Pub. Date: Jun. 2, 2022

(65) Prior Publication Data

US 2023/0091054 A1 Mar. 23, 2023

(30) Foreign Application Priority Data

Nov. 30, 2020 (KR) ........................ 10-2020-0165106
Nov. 29, 2021 (KR) ........................ 10-2021-0166435

(51) Int. Cl.

| | |
|---|---|
| ***C08F 4/659*** | (2006.01) |
| ***C08F 4/6592*** | (2006.01) |
| ***C08F 110/02*** | (2006.01) |

(52) U.S. Cl.
CPC ...... *C08F 4/65927* (2013.01); *C08F 4/65912* (2013.01); *C08F 4/65916* (2013.01); *C08F 110/02* (2013.01)

(58) Field of Classification Search
None
See application file for complete search history.

(56) References Cited

U.S. PATENT DOCUMENTS 6,087,293 A 7/2000 Carnahan et al.
2004/0054101 A1 3/2004 Saudemont et al.
(Continued)

FOREIGN PATENT DOCUMENTS

IT MI981822 A1 2/2000
KR 10-2003-0064739 A 8/2003
(Continued)

OTHER PUBLICATIONS

International Search Report (with translation) and Written Opinion dated Mar. 4, 2022, issued in corresponding International Patent Application No. PCT/KR2021/017812.
(Continued)

*Primary Examiner* — Catherine S Branch
(74) *Attorney, Agent, or Firm* — Morgan, Lewis & Bockius LLP

(57) ABSTRACT

There is provided a method for preparing a metallocene-supported catalyst that exhibits catalytic activity, and yet, can decrease fine generation, and thus, can minimize fouling and chunk generation, and can stably prepare polyethylene having excellent properties.

13 Claims, 2 Drawing Sheets

(56) References Cited

U.S. PATENT DOCUMENTS

| | | | | |
|---|---|---|---|---|
| 2006/0160965 | A1 | 7/2006 | Goode et al. | |
| 2013/0253154 | A1 | 9/2013 | Kim et al. | |
| 2013/0345376 | A1 | 12/2013 | Luo et al. | |
| 2015/0025204 | A1 | 1/2015 | Lee et al. | |
| 2022/0010044 | A1 | 1/2022 | Min et al. | |
| 2022/0049026 | A1 * | 2/2022 | Lim | C08F 4/65912 |

FOREIGN PATENT DOCUMENTS

| | | | |
|---|---|---|---|
| KR | 10-2007-0093066 | A | 9/2007 |
| KR | 10-2012-0061029 | | 6/2012 |
| KR | 10-1498814 | B1 | 3/2015 |
| KR | 10-2016-0067803 | A | 6/2016 |
| KR | 10-2017-0114055 | | 10/2017 |
| KR | 10-2017-0114056 | A | 10/2017 |
| KR | 10-1827523 | B1 | 3/2018 |
| KR | 10-2060639 | A | 12/2019 |
| KR | 10-2020-0036691 | A | 4/2020 |
| KR | 10-2020-0056800 | | 5/2020 |
| KR | 10-2020-0071432 | | 6/2020 |
| WO | 1997/19959 | A1 | 6/1997 |
| WO | 2012/122332 | A1 | 9/2012 |
| WO | 2020/122500 | A1 | 6/2020 |

OTHER PUBLICATIONS

Extended European Search Report dated Jun. 26, 2023, issued in corresponding European Patent Application No. EP 21898735.

* cited by examiner

【FIG. 1a】
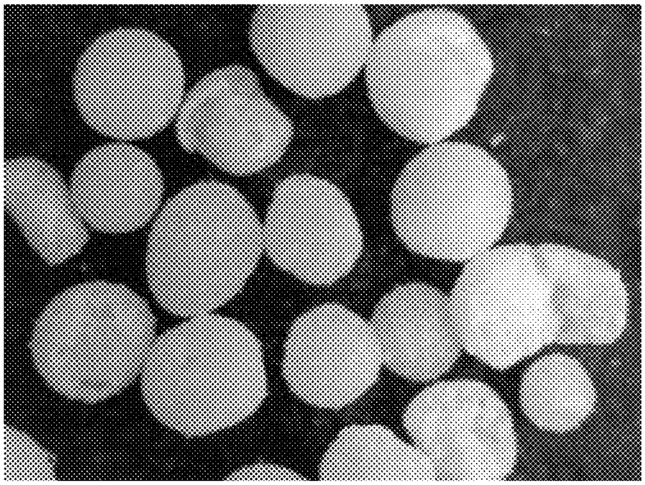
【FIG. 1b】
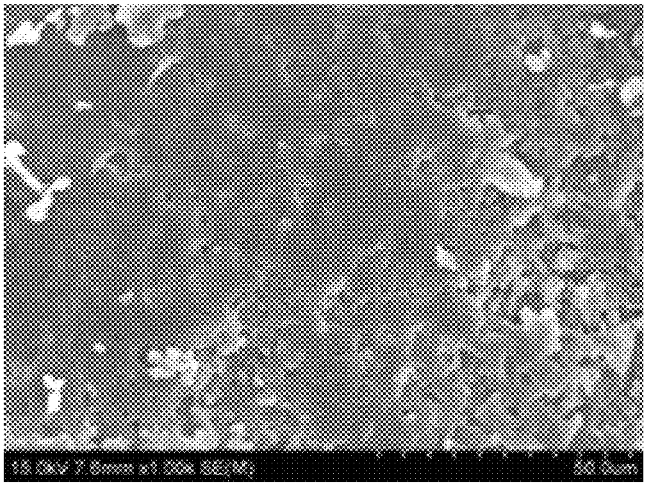

【FIG. 2a】
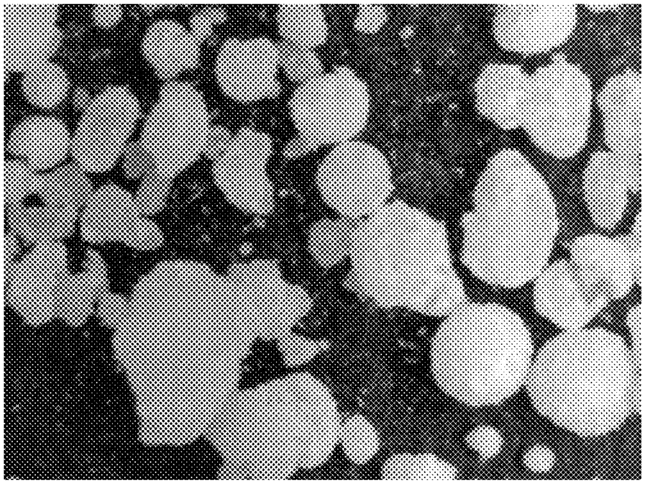
【FIG. 2b】
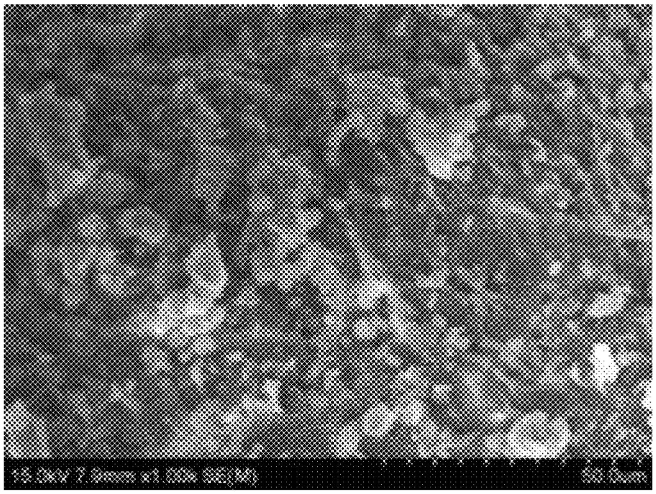

METHOD FOR PREPARING METALLOCENE SUPPORTED CATALYST

TECHNICAL FIELD

CROSS-REFERENCE TO RELATED APPLICATION(S)

This application claims the benefit of Korean Patent Application No. 10-2020-0165106 filed on Nov. 30, 2020 and Korean Patent Application No. 10-2021-0166435 filed on Nov. 29, 2021 with the Korean Intellectual Property Office, the disclosures of which are herein incorporated by reference in their entirety.

This invention relates to a method for preparing a metallocene-supported catalyst that exhibits catalytic activity, and yet, can decrease fine generation, and thus, can minimize fouling and chunk generation, and can stably prepare polyethylene having excellent properties.

BACKGROUND ART

Olefin polymerization systems are divided into Ziegler Natta and metallocene catalyst systems, and these two highly active catalyst systems have been developed corresponding to each characteristic. The Ziegler Natta catalyst has been widely applied in the existing commercial processes since it was invented in the fifties, but since it is a multi-site catalyst with several active sites, it is characterized by wide molecular weight distribution of polymer, and is limited in terms of securing of desired properties due to non-uniform composition distribution of comonomers.

Meanwhile, the metallocene catalyst consists of a main catalyst, of which main component is a transition metal compound, and a cocatalyst, which is an organometal compound including aluminum as the main component, and such a catalyst is a homogeneous complex catalyst and a single site catalyst, obtains polymer with narrow molecular weight distribution and uniform comonomer composition distribution according to the properties of the single site catalyst, and can change the stereoregularity, copolymerization property, molecular weight, crystallinity, etc. according to the modification of the ligand structure of the catalyst and change of polymerization conditions.

The preparation of olefin polymer using the catalyst is classified into solution polymerization, slurry polymerization or gas phase polymerization according to the introduction method of a catalyst.

A gas phase polymerization process wherein a catalyst is introduced in the state of powder, is progressed at a temperature lower than the melting point of produced polymer. However, if the reaction temperature increases above a critical temperature during the reaction, fouling may be generated by fines on the inner wall of the reactor or cooler, and chunk shaped polymer may be produced. Such a phenomenon worsens as the fine concentration in the polymer particles is higher and the size of polymer is smaller, and as the result, discharge of polymer is not smoothly progressed, and long-time operation is made impossible.

DETAILED DESCRIPTION OF THE INVENTION

Technical Problem

It is an object of the invention to provide a method for preparing a metallocene-supported catalyst that exhibits catalytic activity, and yet, can decrease fine generation, and thus, can minimize fouling and chunk generation, and stably prepare polyethylene having excellent properties.

It is another object of the invention to provide a method for preparing polyethylene using a metallocene-supported catalyst prepared by the method.

Technical Solution

According to one embodiment of the invention, there is provided a method for preparing a metallocene-supported catalyst, comprising steps of:

pre-treating a carrier with an alkyl aluminum-based compound represented by the following Chemical Formula 1 and a monoether-based compound having aliphatic chains;

introducing a cocatalyst in the pre-treated carrier and reacting them, to support the cocatalyst in the pre-treated carrier; and introducing a metallocene-based catalyst precursor in the cocatalyst-supported carrier and reacting them, to support the metallocene-based catalyst precursor in the cocatalyst-supported carrier:

$Al(R)_3$ [Chemical Formula 1].

in the Chemical Formula 1, each R is independently $C_{3-20}$ branched alkyl.

According to another embodiment of the invention, there is provided a method for preparing polyethylene, comprising a step of polymerizing ethylene monomers, in the presence of a metallocene-supported catalyst prepared by the above preparation method.

According to still another embodiment of the invention, there are provided polyethylene prepared by the above preparation method, a polyethylene resin composition and a shrink film comprising the same.

Advantageous Effects

A metallocene-supported catalyst prepared by the preparation method according to the invention exhibits excellent catalytic activity, and yet, can significantly decrease fine generation during polymerization, particularly during gas phase polymerization of ethylene monomers. Thus, it can minimize fouling and chunk generation, and stably prepare polyethylene having excellent properties. And, the prepared polyethylene has improved morphology, and thus, may be particularly useful for the preparation of a shrink film.

BRIEF DESCRIPTION OF THE DRAWINGS

FIG. 1*a* and FIG. 1*b* are photographs observing polyethylene prepared in Example 1 with scanning electron microscope at different magnifications (FIG. 1*a* magnification: ×60, FIG. 1*b* magnification: ×1000).

FIG. 2*a* and FIG. 2*b* are photographs observing polyethylene prepared in Comparative Example 4 with scanning electron microscope at different magnifications (FIG. 2*a* magnification: ×60, FIG. 2*b* magnification: ×1000).

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms “comprise”, “equipped” or “have”, etc. are intended to designate the existence of practiced characteristic, number, step, constructional element or combinations thereof, and they are not intended to preclude the possibility of existence or addition of one or more other characteristics, numbers, steps, constructional elements or combinations thereof.

Meanwhile, throughout the specification, an equivalent (eq) means a molar equivalent(eq/mol).

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, a method for preparing a metallocene-supported catalyst, and a method for preparing polyethylene using the same according to specific embodiments of the invention will be explained.

In the prior art, when polymerizing olefin polymer using a metallocene catalyst, fouling was generated due to fines on the inner wall surface of a reactor or cooler according to reaction conditions, and chunk-shaped polymer was generated. In order to solve the problem, a method of treating a catalyst with an antistatic agent has been suggested, but in case an antistatic agent is applied in the common preparation process of a supported catalyst, the catalyst may be easily inactivated by hydroxy groups in the antistatic agent, and the inactivated catalyst may cause fine generation, thus generating fouling and decreasing processability.

Thus, in the present disclosure, when preparing a metallocene-supported catalyst, by pre-treating a carrier with an alkyl aluminum-based compound of a specific structure and a monoether-based compound having aliphatic chains, support capability of a carrier may be increased, thereby increasing catalytic activity, and decreasing fine generation during polymerization, thus decreasing fouling and chunk generation.

Moreover, in case the catalyst is treated with an antistatic agent, inactivation of the catalyst by the antistatic agent may be prevented, and simultaneously, due to high support capability of a carrier for the catalyst, catalytic activity decreased due to the use of an antistatic agent may be compensated, and fine generation and electrostatic generation may be prevented, thereby further decreasing fouling and chunk generation.

A metallocene-supported catalyst prepared by the method exhibits excellent catalytic activity, and yet, can minimize fine generation during polymerization, particularly during gas phase polymerization of ethylene monomers, and stably prepare polyethylene, and the prepared polyethylene may have improved properties and morphology, and thus, be particularly useful for the preparation of a shrink film.

Furthermore, by controlling and optimizing the structure and introduction amount of an antistatic agent, the effect of preventing fine generation and electrostatic generation may be further increased.

Specifically, a method for preparing a metallocene-supported catalyst according to one embodiment of the invention comprises steps of:

pre-treating a carrier with an alkyl aluminum-based compound represented by the following Chemical Formula 1 and a monoether-based compound having aliphatic chains (step 1);

introducing a cocatalyst in the pre-treated carrier and reacting them, to support the cocatalyst in the pre-treated carrier (step 2); and introducing a metallocene-based catalyst precursor in the cocatalyst-supported carrier and reacting them, to support the metallocene-based catalyst precursor in the cocatalyst-supported carrier (step 3):

[Chemical Formula 1].

in the Chemical Formula 1, each R is independently $C_{3-20}$ branched alkyl.

Hereinafter, the method will be explained according to steps.

In the preparation method of a metallocene-supported catalyst according to one embodiment of the invention, step 1 is a step of pre-treating a carrier.

The pre-treatment is conducted to improve support capability of a carrier, and specifically, it may be conducted by reacting an alkyl aluminum-based compound represented by the following Chemical Formula 1 and a monoether-based compound having aliphatic chains, and then, introducing a carrier and reacting.

The reaction of the alkyl aluminum-based compound and the monoether-based compound having aliphatic chains forms a complex. If a carrier is introduced, the complex reacts with the hydroxy group on the surface of the carrier, and is adsorbed on the carrier surface. If the reaction complex of the alkyl aluminum-based compound and the monoether-based compound having aliphatic chains is adsorbed to the surface, binding capacity between aluminum derived from the alkyl aluminum-based compound, and carrier, for example, in the case of a silica carrier, Si, may increase, thus increasing support capability of the carrier. Thus, it is advantageous for supporting a cocatalyst and a metallocene-based catalyst precursor, and support amount may also increase, thereby increasing catalytic activity and improving morphology of prepared polymer.

And, the monoether-based compound having aliphatic chains, due to the characteristic structure, is more advantageous for the formation of complex with the alkyl aluminum-based compound, compared to a hetero cyclic ether-based compound represented by THF, and may increase adsorption rate of alkyl aluminum on the carrier surface. As the result, more excellent effects of increasing catalytic activity and improving morphology of polymer may be exhibited.

The improvement effect may be further increased by controlling the mole ratio of the alkyl aluminum-based compound and the monoether-based compound having aliphatic chains. If the content of the alkyl aluminum-based compound too high, and the content of the monoether-based compound having aliphatic chains is too low, the improvement effect according to the use of the monoether-based compound having aliphatic chains may be insignificant, and if the content of the alkyl aluminum-based compound is too low, and the content of the monoether-based compound having aliphatic chains is too high, support rate of a cocatalyst may be lowered. Thus, in the present disclosure, by using the alkyl aluminum-based compound and the monoether-based compound having aliphatic chains at the mole ratio of 1:0.5 to 1:3, the above-described effects may be further increased. More specifically, the alkyl aluminum-based compound and the monoether-based compound having aliphatic chains may be used at the mole ratio of 1:0.5 or more, or 1:0.8 or more, or 1:1 or more, or 1:1.5 or more, and 1:3 or less, or 1:2.8 or less, or 1:2.5 or less, or 1:2.3 or less, or 1:2 or less, or 1:1.8 or less, based on the monoether-based compound having aliphatic chains. Wherein, the description "the mole ratio of the alkyl aluminum-based compound and monoether-based compound having aliphatic chains is 1:0.5 or more, based on the monoether-based compound having aliphatic chains" means that the amount of the monoether-based compound having aliphatic chains used increases to 0.5 mole fractions or more, and "the mole ratio of the alkyl aluminum-based compound and monoether-based compound having aliphatic chains is 1:3 or more, based on the monoether-based compound having aliphatic chains" means that the amount of the monoether-based compound having aliphatic chains used decreases to 3 mole fractions or less. Namely, it means that, based on one mole of the alkyl aluminum-based compound, the monoether-based compound having aliphatic chains may be used at 0.5 mole fractions or more, or 0.8 mole fractions or more, or 1 mole fraction or more, or 1.5 mole fractions or more, or 3 mole fractions or more, or 2.8 mole fractions or less, or 2.5 mole fractions or less, or 2.3 mole fractions or less, or 1.8 mole fractions or less.

Meanwhile, the alkyl aluminum-based compound is a compound represented by the Chemical Formula 1.

In the Chemical Formula 1, each R is independently, $C_{3-20}$ branched alkyl, more specifically, branched alkyl having a carbon number of 3 or more, or 4 or more, and 20 or less, 10 or less, 8 or less, or 6 or less.

As specific examples, triisopropylaluminum, triisobutylaluminum, tri-t-butylaluminum, triisopentylaluminum, or trineopentylaluminum, and the like may be mentioned, and one of them or mixtures thereof may be used.

The alkyl aluminum-based compound represented by the Chemical Formula 1, due to the structure comprising 3 branched alkyl groups, has small attractive force for the monoether-based compound having aliphatic chains, compared to an alkyl aluminum-based compound comprising linear alkyl such as triethylaluminum, and thus, can be uniformly dispersed in a carrier and bonded.

Meanwhile, the monoether-based compound having aliphatic chains may be a compound represented by the following Chemical Formula 2.

[Chemical Formula 2]

In the Chemical Formula 2, $R_a$ and $R_b$ are each independently, $C_{1-20}$ linear or branched alkyl, more specifically $C_{1-12}$ linear or branched alkyl.

As specific example, methyl t-butyl ether (MTBE), ethyl t-butyl ether, propyl t-butylether, or sec-butyl tert-butyl ether, and the like may be mentioned, and one of them or mixtures thereof may be used.

The reaction between the alkyl aluminum-based compound and the monoether-based compound having aliphatic chains may be conducted at a temperature of 30 to 80° C. in a hydrocarbon-based solvent such as hexane. If the reaction temperature is less than 30° C., reactivity may be deteriorated, and if it exceeds 80° C., it may be difficult to control reaction rate, and side reactions may be generated. More specifically, the reaction may be conducted at 30° C. or more, or 40° C. or more, or 40° C. or more, and 80° C. or less, or 70° C. or less, or 60° C. or less.

After the reaction between the alkyl aluminum-based compound and the monoether-based compound having aliphatic chains is completed, a carrier is introduced and reacted.

The reaction after introduction of the carrier may be conducted at a temperature of 30 to 80° C. If the reaction temperature is less than 30° C., reactivity may be deteriorated, and if it exceeds 80° C., it may be difficult to control reaction rate, and side reactions may be generated. More specifically, the reaction may be conducted at 30° C. or more, or 40° C. or more, or 40° C. or more, and 80° C. or less, or 70° C. or less, or 60° C. or less.

Meanwhile, as the carrier, inorganic substances commonly used in the preparation of a metallocene-supported catalyst, such as silica, magnesia, silica-alumina, or silica-magnesia, and the like, may be used. The carrier may further comprise oxide, carbonate, sulfate, and nitrate components, such as $Na_2O$, $K_2CO_3$, $BaSO_4$, and $Mg(NO_3)_2$.

Among them, in case a silica carrier is used, since the metallocene compound is chemically bonded with the reactive functional groups such as siloxane groups existing on the surface of the silica carrier and supported, little catalyst may be isolated from the carrier surface during a polyethylene polymerization process, and thus, when preparing polyethylene by slurry or gas phase polymerization, fouling caused by adherence to the reactor wall surface or between polymer particles may be minimized.

And, the carrier may satisfy the following requirements, and more specifically, may be a silica carrier satisfying the following requirements:

i) average particle size(D50): 30 μm or more ii) pore volume: 1.4 ml/g or less, and iii) total amount of volatile organic compounds: 5 wt % or less, based on the total weight of a carrier, specifically silica.

Specifically, the carrier may have average particle size (D50) of 30 μm or more. The average particle size of the carrier has an influence on fine content of produced polymer, and if the average particle size is too small, fine content may be high, and thus, the effects of pre-treatment and antistatic agent treatment may decrease, and if it is too large, due to collision between particles during the preparation of a catalyst, the effects of pre-treatment and antistatic agent treatment may decrease. Thus, more specifically, the carrier may have an average particle size(D50) of 30 μm or more, or 35 μm or more, or 40 μm or more, and 60 μm or less, or 55 μm or less, or 50 μm or less, or 40 μm or less.

Meanwhile, in the present disclosure, the average particle size (D50) of the carrier means a particle size at the 50% point in cumulative particle volume distribution according to particle size, when analyzing particle size distribution of the carrier, and it may be measured by a laser diffraction method. Specifically, a carrier is introduced in the state of powder in a hopper of HELOS light diffraction particle size analyzer (manufactured by Sympatec GmbH) equipped with a free aero jet dry disperser for light diffraction, RODOS/M (dispersion nozzle diameter: 4 mm, vibrating sample feeder: VIBRI) (manufactured by Sympatec GmbH), and while setting the method in the range of 0.5 to 350 μm, when the carrier particles pass through laser beam, difference in diffraction pattern according to particle size is measured and particle size distribution is analyzed, and from the results, particle size (D50) at the 50% point in cumulative particle volume distribution according to particle size may be calculated.

The carrier may have pore volume of 1.4 ml/g or less, more specifically 1.4 ml/g or less, or 1.38 ml/g or less, or 1.35 ml/g or less, and 1.0 ml/g or more, or 1.2 ml/g or more, or 1.3 ml/g or more, or 1.32 ml/g or more. The pore volume of the carrier may have influence on catalytic activity and bulk density of polymer. If the pore volume of the carrier is too large or too small, catalytic activity may be lowered, or bulk density of polymer may decrease.

In the present disclosure, the pore volume of the carrier may be measured as pore volume per unit mass of the carrier, using BET measuring device of Belsorp-max model (manufactured by MicrotracBEL). Specifically, when a carrier sample is loaded on the BET measuring device, the measuring device automatically measures the amount of gas adsorbed and desorbed to the sample on the basis of relative pressure, and based on the measurement value of gas amount and the mass of the sample, pore volume per unit mass of the sample is automatically measured and calculated.

The carrier may have total volatile organic compound (TVOC) content of 5 wt % or less, based on the total weight of the carrier. If the TVOC content in the silica carrier is high, due to high moisture content, catalytic activity may decrease, and fine generation may increase. More specifically, TVOC content may be 5 wt % or less, or 4 wt % or less, or 3.5 wt % or less, or 3 wt % or less, based on the total weight of the carrier. The lower TVOC content is more preferable, but considering the preparation process, TVOC content may be greater than Owt %, or 0.0001 wt % or more, or 0.01 wt % or more or 0.1 wt % or more, based on the total weight of the carrier.

In the present disclosure, TVOC content in the carrier may be measured by a common method using a thermogravimetric analyzer. Specifically, using TGA 4000 thermogravimetric analyzer (manufactured by Perkin Elmer), under nitrogen atmosphere, the temperature of a carrier sample is raised from room temperature (25° C.) to 900° C. at a speed of 20° C./min, and then, mass loss generated in the carrier sample is measured using a recording microbalance in a computer-controlled oven chamber, and TVOC content is calculated therefrom. Wherein, nitrogen flow rate is set to 60-70 mL/min.

When using a carrier, particularly, a silica carrier, meeting the above property requirements, morphology of prepared polymer may be further improved.

Next, step 2 is a step of supporting a cocatalyst in the carrier pre-treated in step 1.

The cocatalyst performs a function for increasing catalytic activity and process stability, and specifically, an alkylaluminoxane-based compound represented by the following Chemical Formula 3 may be used:

$$—[Al(R_c)—O]_m—$$ [Chemical Formula 3]

In the Chemical Formula 3, each $R_c$ may be identical to or different from each other, and each independently, $C_{1-20}$ alkyl, and m is an integer of 2 or more.

As specific examples, methylaluminoxane, ethylaluminoxane, sobutylaluminoxane, or butylaluminoxane, and the like may be mentioned, and one of them or mixtures thereof may be used. More specifically, methylaluminoxane may be used.

The alkylaluminoxane-based compound acts as scavenger of hydroxy groups existing on the carrier surface to improve catalytic activity, and converts the halogen group of a catalyst precursor into a methyl group, thus promoting chain growth during polymerization of polyethylene, and particularly, when used in combination with a metallocene-based catalyst precursor described below, more excellent catalytic activity may be exhibited.

The cocatalyst may be supported in the content of 0.1 mmol or more or 5 mmol or more, or 8 mmol or more, or 10 mmol or more, or 15 mmol or more, and 25 mmol or less, or 20 mmol or less, per weight of a carrier, for example, 1g of a silica carrier. When included in the above content range, fine generation reduction effect as well as catalytic activity improvement effect according to the use of the cocatalyst may be sufficiently obtained.

The cocatalyst support process may be conducted by introducing a cocatalyst in a dispersion in which the pretreated carrier, obtained in step 1, is dispersed, and reacting them while heating to a temperature of 70 to 100° C. More specifically, it may be conducted by reacting under stirring at a temperature of 70° C. or more, or 80° C. or more, and less than 100° C., or 90° C. or less, for 40 minutes or more, or 1 hour or more, or 3 hours or more, or 5 hours or more, and 10 hours or less, or 8 hours or less, or 7 hours or less.

The cocatalyst may be introduced in the form of solid powder, or introduced in the state of a solution in a hydrocarbon-based solvent such as hexane, toluene, and the like. Wherein, the concentration of the cocatalyst in the solution may be appropriately determined considering the support amount of the cocatalyst, and reaction time, and the like.

Nex, step 3 is a step of supporting a metallocene-based catalyst precursor in the cocatalyst-supported carrier obtained in step 2.

Specifically, the metallocene-based catalyst precursor comprises one or more of a first metallocene compound represented by the following Chemical Formula 4; a second metallocene compound represented by the following Chemical Formula 5:

[Chemical Formula 4]

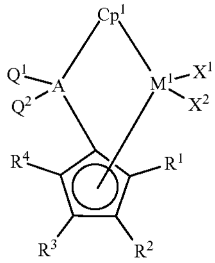

in the Chemical Formula 4, $A4^1$ is Group 4 transition metal;

A is carbon, silicon, or germanium;

$Cp^1$ is indenyl, and is substituted with one or more substituents selected from the group consisting of hydrogen, a C1-30 hydrocarbyl group, a C1-30 hydrocarbyloxy group, a C2-30 hydrocarbyloxyhydrocarbyl group, a C1-20 hydrocarbyl(oxy)silyl group, and a C1-20 silylhydrocarbyl group, or unsubstituted, $R^1$ to $R^4$ are identical to or different from each other, and each independently, hydrogen a C1-30 hydrocarbyl group, a C1-30 hydrocarbyloxy group, or a C2-30 hydrocarbyloxyhydrocarbyl group;

$Q^1$ and $Q^2$ are identical to or different from each other, and each independently, a C1-30 hydrocarbyl group, a C1-30 hydrocarbyloxy group or a C2-30 hydrocarbyloxyhydrocarbyl group; and $X^1$ and $X^2$ are identical to or different from each other, and each independently, halogen, a nitro group, an amido group, a phosphine group, a phosphide group, a C1-30 hydrocarbyl group, a C1-30 hydrocarbyloxy group, a C2-30 hydrocarbyloxyhydrocarbyl group, —$SiH_3$, a C1-30 hydrocarbyl (oxy)silyl group, a $C_1$-30 sulfonate group, or a C1-30 sulfone group;

[Chemical Formula 5]

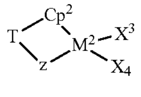

in the Chemical Formula 5, $M^2$ is Group 4 transition metal;

$X^3$ and $X^4$ are identical to or different from each other, and each independently, halogen, a nitro group, an amido group, a phosphine group, a phosphide group, a C1-30 hydrocarbyl group, a C1-30 hydrocarbyloxy group, a C2-30 hydrocarbyloxyhydrocarbyl group, —$SiH_3$, a C1-30 hydrocarbyl (oxy)silyl group, a C1-30 sulfonate group, or a C1-30 sulfone group;

Z is —O—, —S—, —$NR^5$—, or —$PR^6$—, $R^5$ and $R^6$ are each independently, hydrogen, a C1-20 hydrocarbyl group, a C1-20 hydrocarbyl(oxy)silyl group, or a C1-20 silylhydrocarbyl group;

T is

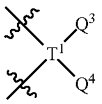

or

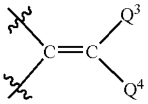

, $T^1$ is C, Si, Ge, Sn or Pb, $Q^3$ is hydrogen, a $C_{1-30}$ hydrocarbyl group, a C1-30 hydrocarbyloxy group, a C2-30 hydrocarbyloxyhydrocarbyl group, —$SiH_3$, a C1-30 hydrocarbyl(oxy)silyl group, a C1-30 hydrocarbyl group substituted with halogen, or —$NR^7R^8$, $Q^4$ is a C2-30 hydrocarbyloxyhydrocarbyl group, $R^7$ and $R^8$ are each independently, one of hydrogen and a C1-30 hydrocarbyl group, or they are linked to each other to form an aliphatic or aromatic ring;

$Cp^2$ is one of ligands represented by the following Chemical Formulas 6a to 6d,

[Chemical Formula 6a]

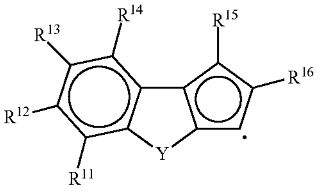

[Chemical Formula 6b]

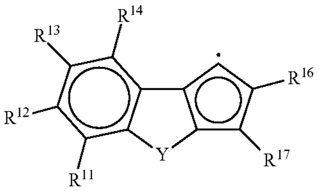

[Chemical Formula 6c]

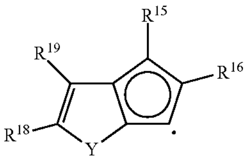

[Chemical Formula 6d]

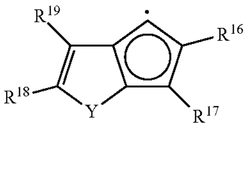

in the Chemical Formulas 6a to 6d,

Y is O or S, $R^{11}$ to $R^{19}$ are identical to or different from each other, and are each independently, one of hydrogen, a C1-30 hydrocarbyl group, or a C1-30 hydrocarbyloxy group, denotes a part bonding to T.

Throughout the specification, unless otherwise limited, the following terms may be defined as follows.

A hydrocarbyl group is a monovalent functional group formed by removing a hydrogen atom from hydrocarbon, and may include an alkyl, alkenyl, alkynyl, aryl, aralkyl, aralkenyl, aralkynyl, alkylaryl, alkenylaryl, and alkynylaryl group. A C1-30 hydrocarbyl group may be a hydrocarbyl group having carbon number of 1 to 20 or 1 to 10. For example, a hydrocarbyl group may be linear, branched or cyclic alkyl. More specifically, a C1-30 hydrocarbyl group may be a linear, branched or cyclic alkyl group, such as methyl, ethyl n-propyl, iso-propyl, n-butyl, iso-butyl, tert-butyl, n-pentyl, n-hexyl, n-heptyl, cyclohexyl, and the like; or an aryl group, such as phenyl, biphenyl, naphthyl, anthracenyl, phenanthrenyl, or fluorenyl, and the like. It may be alkylaryl such as methylphenyl, ethylphenyl, methylbiphenyl, methylnaphthyl, and the like, or arylalkyl such as phenylmethyl, phenylethyl, biphenylmethyl, naphthylmethyl, and the like. It may be alkenyl such as allyl, ethenyl, propenyl, butenyl, pentenyl, and the like.

A hydrocarbyloxy group is a functional group in which a hydrocarbyl group is bonded to oxygen. Specifically, a C1-30 hydrocarbyloxy group may be a hydrocarbyloxy group having carbon number of 1 to 20 or 1 to 10. For example, a hydrocarbyloxy group may be linear, branched or cyclic alkyl. More specifically, a C1-30 hydrocarbyloxy group may be a linear, branched or cyclic alkoxy group, such as a methoxy, ethoxy, n-propoxy, iso-propoxy, b-butoxy, iso-butoxy, tert-butoxy, n-pentoxy, n-hexoxy, n-heptoxy, cyclohexoxy group, and the like; or an aryloxy group, such as a phenoxy or naphthalenoxy group, and the like.

A hydrocarbyloxyhydrocarbyl group is a functional group in which one or more hydrogen atoms of the hydrocarbyl group are substituted with one or more hydrocarbyloxy groups. Specifically, a C2-30 hydrocarbyloxyhydrocarbyl group may be a C2-20 or C2-15 hydrocarbyloxyhydrocarbyl group. For example, a hydrocarbyloxyhydrocarbyl group may be a linear, branched or cyclic alkyl. More specifically, a C2-30 hydrocarbyloxyhydrocarbyl group may be an alkoxyalkyl group, such as a methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl group, and the like; or an aryloxyalkyl group such as a phenoxyhexyl group, and the like.

A hydrocarbyl(oxy)silyl group is a functional group in which 1 to 3 hydrogen of —$SiH_3$ are substituted with 1 to 3 hydrocarbyl groups or hydrocarbyloxy groups. Specifically, a C1-30 hydrocarbyl(oxy)silyl group may be a C1-20, C1-15, C1-10 or C1-5 hydrocarbyl(oxy)silyl group. More specifically, a C1-30 hydrocarbyl(oxy)silyl group may be an alkylsilyl group, such as a methyl silyl, dimethylsilyl, trimethylsilyl, dimethylethylsilyl, diethylmethylsilyl or dimethylpropylsilyl group, and the like; an alkoxysilyl group, such as a methoxysilyl, dimethoxysilyl, trimethoxysilyl or dimethoxyethoxysilyl group, and the like; or an alkoxyalkylsilyl group, such as a methoxydimethylsilyl, diethoxymethylsilyl or dimethoxypropylsilyl group, and the like.

A C1-20 silylhydrocarbyl group is a functional group in which one or mor hydrogen of a hydrocarbyl group are substituted with silyl groups. The silyl group may be —$SiH_3$ or a hydrocarbyl(oxy)silyl group. Specifically, a C1-20 silylhydrocarbyl group may be a C1-15 or C1-10 silylhydrocarbyl group. More specifically, a C1-20 silylhydrocarbyl group may be a silylalkyl group such as $-CH_2-SiH_3$, and the like; an alkylsilylalkyl group, such as a methyl silylmethyl, methyl silyl ethyl , dimethyl silylmethyl, trimethyl silylmethyl, dimethylethylsilylmethyl, diethylmethylsilylmethyl or dimethylpropylsilylmethyl group, and the like; or an alkoxysilylalkyl group such as a dimethylethoxysilylpropyl group, and the like.

Halogen may be fluorine(F), chlorine(Cl), bromine(Br) or iodine(I).

A sulfonate group has a structure of $-O-SO_2-R^a$, wherein $R^a$ may be a C1-30 hydrocarbyl group. Specifically, a C1-30 sulfonate group may be a methansulfonate or phenylsulfonate group, and the like.

A C1-30 sulfone group has a structure of $-R^b-SO_2-R^c$, wherein $R^b$ and $R^c$ are identical to or different from each other, and are each independently, a C1-30 hydrocarbyl group. Specifically, a C1-30 sulfone group may be a methylsulfonylmethyl, methylsulfonylpropyl, methyl sulfonylbutyl or phenylsulfonylpropyl group, and the like.

Throughout the specification, the description "two neighboring substituents are linked to each other to form an aliphatic or aromatic ring" means that atom(s) of two substituents and atom(s) to which the two substituents are bonded are linked to each other to form a ring. Specifically, as the example of the case wherein Wand $R^8$ of $-NR^7R^8$ are linked to each other to form an aliphatic ring, a piperidinyl group may be mentioned, and as the example of the case wherein of $R^7$ and $R^8$ of $-NR^7R^8$ are linked to each other to form an aromatic ring, a pyrrolyl group may be mentioned.

Group 4 transition metal may be titanium (Ti), zirconium (Zr), hafnium (Hf), or rutherfordium (Rf), and specifically titanium (Ti), zirconium (Zr), or hafnium (Hf), and more specifically zirconium (Zr), or hafnium (Hf), but is not limited thereto.

The above explained substituents may be optionally substituted with one or more substituents selected from the group consisting of a hydroxy group; halogen; a hydrocarbyl group; a hydrocarbyloxy group; a hydrocarbyl group or hydrocarbyloxy group comprising one or more heteroatoms selected from Group 14 to Group 16 heteroatoms; a silyl group; a hydrocarbyl(oxy)silyl group; a phosphine group; a phosphide group; a sulfonate group; and a sulfone group, within a range where the effects identical or similar to aimed effects may be exhibited.

In the present disclosure, the metallocene-based catalyst precursor comprises the first and second metallocene compounds of the above structures, and thus, can prepare polyethylene having excellent shrinkage and processability, as well as excellent mechanical properties.

Specifically, the first metallocene compound represented by the Chemical Formula 4 increases long chain branch (LCB) content, thus contributing to improvement in mechanical properties through molecular structure improvement and distribution change, and the second metallocene compound represented by the Chemical Formula 5 increases short chain branch (SCB) content, thus contributing to improvement in shrinkage and processability.

Specifically, in the Chemical Formula 4, $M^1$ may be titanium (Ti), zirconium (Zr) or hafnium (Hf), preferably zirconium (Zr).

In the Chemical Formula 4, A may be silicon (Si).

In the Chemical Formula 4, $X^1$ and $X^2$ may be independently halogen, specifically chlorine.

In the Chemical Formula 4, $Cp^1$ is an indenyl group, and the $Cp^1$ may be substituted with one or more substituents selected from the group consisting of hydrogen, C1-10 alkyl, C1-10 alkoxy, C2-10 alkenyl, C6-12 aryl, C7-14 arylalkyl, C7-14 alkylaryl, C1-10 alkylsilyl, C1-10 silylalkyl, and C2-12 alkylsilylalkyl group, or unsubstituted. More specifically, $Cp^1$ may be substituted with one or more substituents selected from the group consisting of hydrogen, methyl, ethyl, propyl, butyl, butenyl, trimethylsilylmethyl, phenyl and t-butylphenyl, or unsubstituted.

In the Chemical Formula 4, $R^1$ to $R^4$ may be each independently, hydrogen or a C1-20 alkyl. Specifically, $R^1$ to $R^4$ may be each independently, hydrogen or C1-3 alkyl group, and more specifically, all of $R^1$ to $R^4$ may be hydrogen, or methyl.

In the Chemical Formula 4, each of $Q^1$ and $Q^2$ may be a C1-20 alkyl, C6-12 aryl, or C2-20 alkoxyalkyl group, specifically C1-6 alkyl, C6-12 aryl, or C2-12 alkoxyalkyl, more specifically, methyl, ethyl, phenyl or t-butoxyhexyl.

The first metallocene compound may be specifically represented by the following Chemical Formula 4-1 or 4-2, and one of them or a mixture thereof may be used:

[Chemical Formula 4-1]

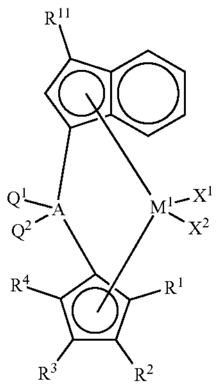

[Chemical Formula 4-2]

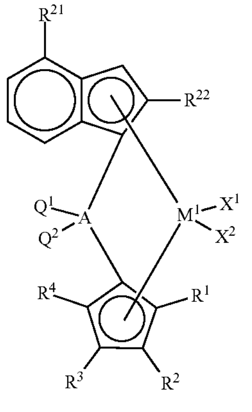

In the Chemical Formulas 4-1 and 4-2, $M^1$, $X^1$, $X^2$, $R^1$ to $R^4$, $Q^1$, and $Q^2$ are defined above, $R^{11}$ may be hydrogen, C1-10 alkyl, C1-10 alkoxy, C2-10 alkenyl, C6-12 aryl, C7-14 arylalkyl, C7-14 alkylaryl, C1-10 alkylsilyl, C1-10 silylalkyl, or C2-12 alkylsilylalkylene group, and more specifically, hydrogen, methyl, ethyl, propyl, butyl, butenyl, trimethylsilylmethyl, or phenyl.

$R^{21}$ may be a C1-10 alkyl, C1-10 alkoxy, C2-10 alkenyl, C6-12 aryl, C7-14 arylalkyl group, and more specifically, C7-14 arylalkyl group such as t-butylphenyl.

$R^{22}$ may be a C1-10 linear or branched alkyl group, and more specifically, a C3-6 branched alkyl group such as isopropyl.
The first metallocene compound may be selected from the group consisting of the following compounds (4a) to (4p):
(4a)
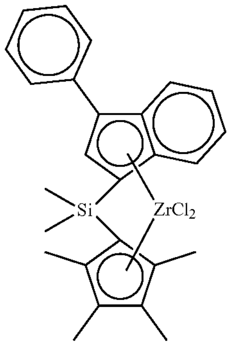
(4b)
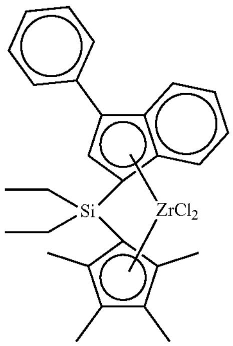
(4c)
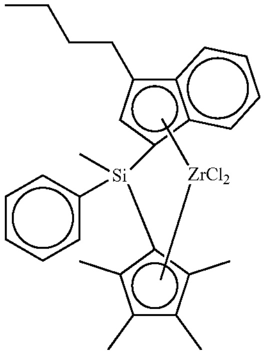
(4d)
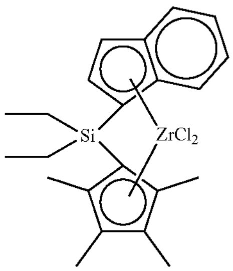
-continued
(4e)
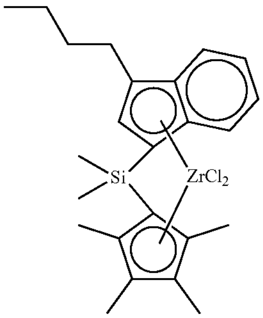
(4f)
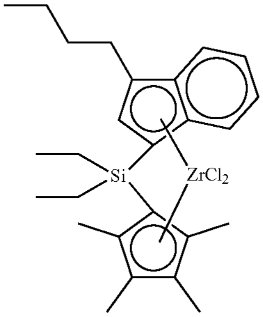
(4g)
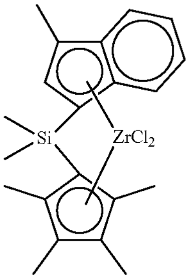
(4h)
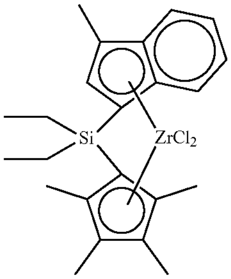
(4i)
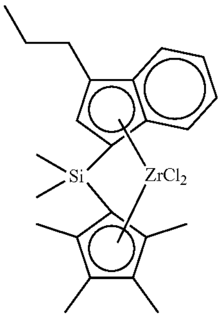

-continued (4j)

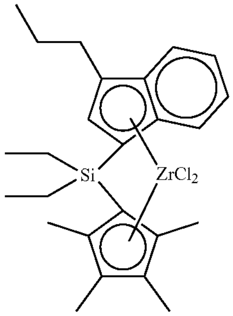

(4k)

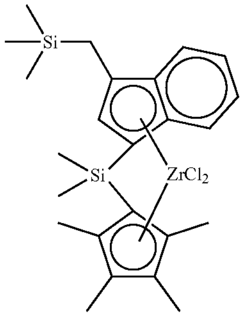

(4l)

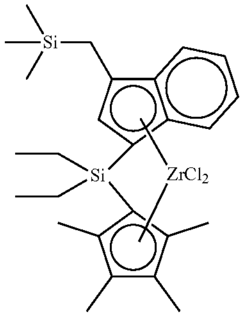

(4m)

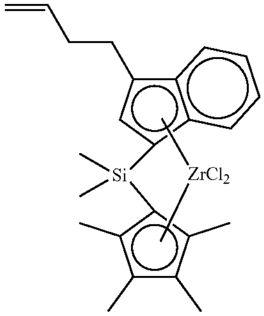

(4n)

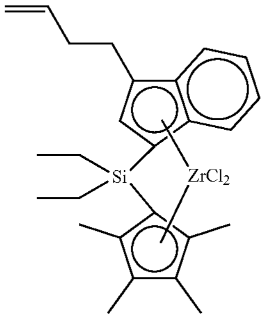

-continued (4o)

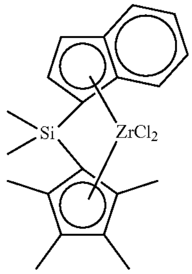

(4p)

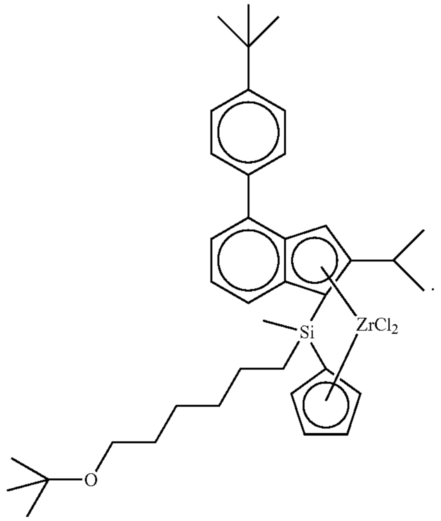

The first metallocene compounds represented by the above structural formulas may be synthesized applying known reactions, and for more detailed synthesis method, examples may be referred to.

Meanwhile, the second metallocene compound may be specifically, a compound of the Chemical Formula 5 wherein Z is —$NR^5$—, and $R^5$ is a C1-10 hydrocarbyl group, and specifically, $R^5$ is a C1-6 linear or branched alkyl group, more specifically, a C3-6 branched alkyl group such as tert-butyl.

In the Chemical Formula 5, T may be

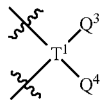

, $T^1$ may be carbon(C) or silicon(Si), $Q^3$ may be a C1-30 hydrocarbyl group, or a C1-30 hydrocarbyloxy group, and $Q^4$ may be a C2-30 hydrocarbyloxyhydrocarbyl group. Specifically, $Q^3$ may be a C1-10 hydrocarbyl group, $Q^4$ may be a C2-12 hydrocarbyloxyhydrocarbyl group, and more specifically, $Q^3$ may be a C1-6 alkyl group, $Q^4$ may be a C1-6 alkyl group substituted with a C1-6 alkoxy group. More specifically, $T^1$ may be silicon(Si), $Q^3$ may be methyl, and $Q^4$ may be tert-butoxy substituted hexyl.

Specifically, the second metallocene compound may be represented by one of the following Chemical Formulas 5-1 to 5-4, and one of them or a mixture thereof may be used:

[Chemical Formula 5-1]

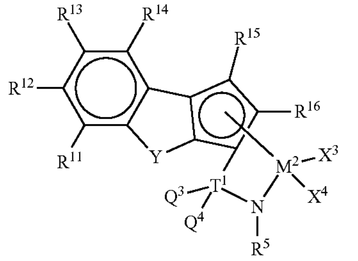

[Chemical Formula 5-2]

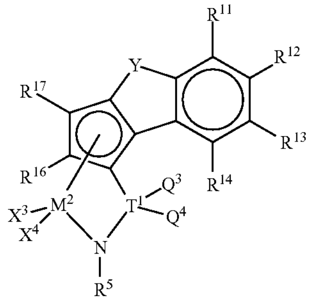

[Chemical Formula 5-3]

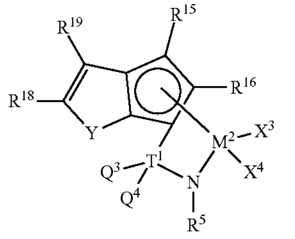

[Chemical Formula 5-4]

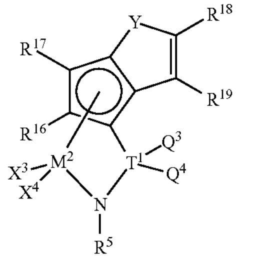

In the Chemical Formulas 5-1 to 5-4, $M^2$, $X^3$, $X^4$, $T^1$, $Q_3$, $Q^4$, $R^5$ and $R^{11}$ to $R^{19}$ are as defined in the Chemical Formula 5.

In the Chemical Formula 5, $R^{11}$ to $R^{14}$, $R^{18}$ and $R^{19}$ may be each independently, hydrogen or a C1-10 hydrocarbyl group, and $R^{15}$ to $R^{17}$ may be each independently, a C1-10 hydrocarbyl group. More specifically, $R^{11}$ to $R^{14}$, and $R^{19}$ may be each independently, hydrogen or C1-10 alkyl, and $R^{15}$ to $R^{17}$ may be each independently, C1-10 alkyl. Even more specifically, to $R^{11}$ to $R^{14}$, $R^{18}$ and $R^{19}$ may be each independently, hydrogen or methyl, and $R^{15}$ to $R^{17}$ may be each independently, methyl.

In the Chemical Formula 5, $M^2$ may be titanium (Ti), zirconium (Zr), or hafnium (Hf), specifically titanium (Ti).

In the Chemical Formula 5, each of $X^3$ and $X^4$ may be halogen or C1-10 alkyl or C1-6 alkyl, and specifically, chlorine or methyl.

In the Chemical Formula 5, the second metallocene compound may be selected from the group consisting of compounds (5a) to (5c).

(5a)

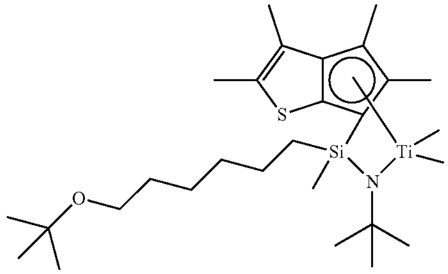

(5b)

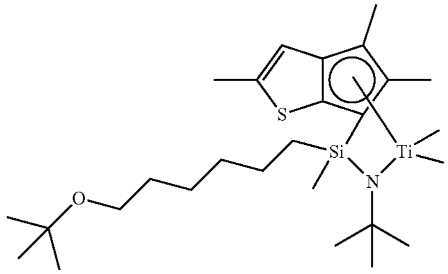

(5c)

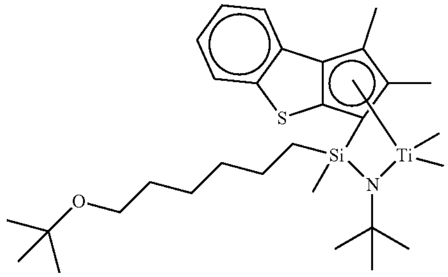

The second metallocene compound represented by the above structural formulas may be synthesized applying known reactions, and for more detailed synthesis method, examples may be referred to.

In the present disclosure, the first and second metallocene compounds may be in the form of meso isomers, racemic isomers, or a mixture thereof Throughout the specification, the term "racemic forms" or "racemic bodies" or "racemic isomers" mean that identical substituents on two cyclopentadienyl moieties exist on opposite sides, on the basis of the plane including the transition metal represented by M' in the Chemical Formula 4, for example, zirconium (Zr) or hafnium (Hf), and the like, and the middle of the cyclopentadienyl.

The term "meso forms" or "meso isomers" are stereoisomers of the above explained racemic isomer, wherein identical substituents on two cyclopentadienyl moieties exist on the same sides, on the basis of the plane including the transition metal represented by $M^1$ in the Chemical Formula 4, for example, zirconium (Zr) or hafnium (Hf), and the like, and the middle of the cyclopentadienyl.

Meanwhile, in the metallocene-supported catalyst according to one embodiment of the invention, the metallocene-based catalyst precursor may comprise one or more of the first metallocene compounds, or one or more of the second metallocene compounds, or a mixture of the first metallocene compounds and the second metallocene compounds.

In case a mixture of the first metallocene compound and the second metallocene compound is used, the first metallocene compound and the second metallocene compound may be supported at the mole ratio of 1:0.2 to 1:2. By comprising the first and second metallocene compounds at the above mole ratio, excellent support capability, catalytic activity and high copolymerizabiltiy may be exhibited. Particularly, in case low density polyethylene is prepared through a gas phase polymerization process, process stability may be improved, and thus, fouling frequently generated in the past may be prevented. If the mole ratio of the first metallocene compound and second metallocene compound is less than 1:0.2, and the content of the second metallocene compound is too low, only the first metallocene compound may play a leading part, and thus, it may be difficult to realize a desired molecular structure of polymer, and mechanical properties may be deteriorated. In the mole ratio of the first metallocene compound and second metallocene compound is greater than 1:2, and the content of the second metallocene compound is too high, only the second metallocene compound may play a leading part, and thus, processability and shrinkage may be lowered. More specifically, the mole ratio of the first metallocene compound and second metallocene compound may be 1:0.2 or more, or 1:0.3 or more, or 1:0.4 or more, or 1:0.5 or more, and 1:2 orless, or 1:1.8 orless, or 1:1.5 orless, or 1:1.2 or less, or 1:1 or less, or 1:0.8 or less, based on the amount of the second metallocene compound used. Wherein, description "the mole ratio of the first metallocene compound and second metallocene compound is 1:0.2 or more, based on the amount of the second metallocene compound used" means that the amount of the second metallocene compound used increases to 0.2 mole fractions or more, and "the mole ratio of the first metallocene compound and second metallocene compound is 1:2 or less, based on the amount of the second metallocene compound used" means that the amount of the second metallocene compound used decreases to 2 mole fractions or less. Namely, the second metallocene compound may be used at 0.2 moles or more, or 0.3 mole or more, or 0.4 mores or more, or 0.5 moles or more, and 2 moles or less, or 1.8 moles or less, or 1.5 moles or less, or 1.2 moles or less, or 1 mole or less, or 0.8 moles or less, based on one mole of the first metallocene compound.

The metallocene-based catalyst precursor may be supported in the content range of 100 μmol or more, or 150 μmol or more, and 450 μmol or less, or 500 μmol or less, based on the weight of carrier, for example 1 g of silica carrier. When supported in the above content range, appropriate activity of the supported catalyst may be exhibited, and thus, it may be advantageous in terms of maintenance of catalytic activity and economic efficiency.

Meanwhile, the step of supporting the metallocene-based catalyst precursor in the cocatalyst-supported carrier obtained in step 2 may be conducted according to a common method.

Specifically, it may be conducted by introducing a metallocene-based catalyst precursor in a dispersion in which the cocatalyst-supported carrier obtained in step 2 is supported, and reacting at a temperature of 40 to 80° C. More specifically, it may be conducted by reacting at a temperature of 40° C. or more, or 50° C. or more, and 80° C. or less, or 70° C. or less.

When the metallocene-based catalyst precursor is introduced, the first and second metallocene compounds may be simultaneously introduced, the first metallocene compound may be introduced first and then the second metallocene compound may be introduced, or the second metallocene compound may be introduced first and then the first metallocene compound may be introduced.

The metallocene-based catalyst precursor may be introduced in a solution phase, wherein hydrocarbon-based solvents such as toluene and the like may be used as a solvent. The concentration of the metallocene compound in the solution may be appropriately determined considering support amount of the metallocene compound in the support catalyst, and reaction efficiency, and the like.

Through the above preparation steps, a supported catalyst in which a cocatalyst and metallocene-based catalyst precursor are supported on a carrier pre-treated with an alkyl aluminum-based compound and the monoether-based compound having aliphatic chains, is prepared. Since the supported catalyst prepared exhibits excellent catalytic activity, it may be used as a catalyst for preparing olefin polymer, or may be treated with an antistatic agent before use so as to prevent electrostatic generation during polymerization.

Thus, the preparation method of a metallocene-supported catalyst according to one embodiment of the invention may further comprise, after the step of supporting the metallocene-based catalyst precursor, a step of introducing an antistatic agent in the carrier in which the metallocene-based catalyst precursor is supported, and reacting (step 4).

Specifically, in the step 4, an antistatic agent is introduced in the carrier in which the metallocene-based catalyst precursor and cocatalyst are supported, prepared in the step 3, and reacted to prepare a metallocene-supported catalyst.

In the preparation method according to one embodiment of the invention, the antistatic agent specifically comprises one or more first antistatic agents selected from the group consisting of ethoxylated alkylamine-based and sulfonic acid-based compounds; and one or more second antistatic agents selected from the group consisting of fatty acid ester and fatty acid metal salts.

The first antistatic agent has excellent antistatic property but has low dispersity, and thus, when used alone, there is a big difference between antistatic properties according to the position of a catalyst. To the contrary, the second antistatic agent, when used alone, has lower effects of inhibiting fine generation and decreasing static electricity than the first antistatic agent, but it assists in dispersion of the first antistatic agent and improves flowability. Thus, by using the first antistatic agent and the second antistatic agent in combination, antistatic property difference of the first antistatic agent may be decreased, thereby enhancing the effects of decreasing fines and improving electrostatic property.

By controlling the weight ratio of the first antistatic agent and second antistatic agent mixed, the effects of improving catalytic activity and decreasing fines, thus improving morphology may be further enhanced. Specifically, in the present disclosure, the first antistatic agent and the second antistatic agent may be used at the weight ratio of 10:90 to 90:10, and more specifically, the first antistatic agent and the second antistatic agent may be used at the weight ratio of 10:90 or more, or 20:80 or more, or 30:70: or more, or 40:60 or more, or 50:50 or more, or 60:40 or more, or 65:35 or more, and 90:10 or less, or 80:20 or less, or 75:25 or less, or 70:30 or less, based on the first antistatic agent. Wherein, the description "the weight ratio of the first antistatic agent and the second antistatic agent is 10:90 or more, based on the first antistatic agent" means that the amount of the first antistatic agent increases to 10 parts by weight or more, and "the weight ratio of the first antistatic agent and the second antistatic agent is 90:10 or more, based on the first antistatic agent" means that the amount of the first antistatic agent decreases to 90 parts by weight or less. Namely, the first antistatic agent may be used in the amount of 10 wt % or more, or 20 wt % or more, or 30 wt % or more, or 40 wt % or more, or 50 wt % or more, or 60 wt % or more, or 65 wt % or more, and 90 wt % or less, or 80 wt % or less, or 75 wt % or less, or 70 wt % or less, based on the total weight of the first antistatic agent and second antistatic agent.

More specifically, in case the first antistatic agent and the second antistatic agent are used at the weight ratio of 60:40 to 70:30, higher catalytic activity may be exhibited, and yet, fine generation may be minimized, and thus, the effects of improving electrostatic property and improving morphology of polymer may be realized.

In the first antistatic agent, the ethoxylated alkylamine may be a specifically, a compound represented by the following Chemical Formula 7:

$R_dN—(CH_2CH_2OH)_2$ [Chemical Formula 7]

In the Chemical Formula 7, $R_d$ may be $C_{8-30}$ linear or branched alkyl, and when $R_d$ comprises an alkyl group having the above range of carbon number, fine decreasing effect may be exhibited through excellent antistatic function, without inducing unpleasant smell.

More specifically, the ethoxylated alkylamine may be a compound of the Chemical Formula 7 wherein $R_d$ is $C_{8-22}$ linear alkyl, $C_{10-18}$ linear alkyl, or $C_{13-15}$ linear alkyl, and one of the compounds or mixtures thereof may be used.

As specific examples of the ethoxylated alkylamine, N,N-bis(2-hydroxyethyl)tridecylamine (N,N-bis(2-hydroxyethyl)tridecylamine), N,N-bis(2-hydroxyethyl)pentadecylamine (N,N-bis(2-hydroxyethyl)pentadecylamine), or N,N-bis(2-hydroxyethyl)octadecylamine(N,N-bis(2-hydroxyethyl)octadecylamine), and the like may be mentioned, and one of them or mixtures thereof may be used. Alternatively, commercially available ethoxylated alkylamine-based antistatic agents may be also used, and for example, Atmer™163(manufactured by CRODA company) may be used as N,N-bis(2-hydroxyethyl)octadecylamine.

As the sulfone-based compound, organic sulfonic acid or metals salts of the organic sulfonic acid may be used, and as specific examples, dodecylbenzenesulfonic acid, toluenesulfonic acid, camphorsulfonic acid, benzenesulfonic acid, and styrenesulfonic acid, or metal salts thereof, and the like may be mentioned, and one of them or mixtures thereof may be used. Commercially available sulfonic acid-based antistatic agents may be also used, and for example, Statsafe™ 6000(manufactured by innospec company) may be used as dodecylbenzenesulfonic acid.

Meanwhile, as the second antistatic agent, one or more compounds selected from the group consisting of fatty acid ester and fatty acid metal salts may be used.

The fatty acid ester is a compound wherein fatty acid, and mono-valent or polyvalent alcohol are ester-bonded, and specifically, fatty acid alkyl ester in which fatty acid and monovalent alcohol such as methanol, ethanol, propanol, or butanol are ester-bonded, such as methyl stearate, ethyl stearate, propyl stearate, butyl stearate, or ethyl palmitate, and the like; or glycerol fatty acid ester in which fatty acid and multivalent alcohol of glycerol are ester-bonded, such as glycerol stearate (glycerol monostearate or 2,3-dihydroxypropyl octadecenoate), glycerol palmitate (glycerol monopahnitate or 2,3-dihydroxypropyl hexadecanoate), glycerol oleate, and the like may be mentioned, and one of them or mixtures thereof may be used.

Among the fatty acid ester, glycerol fatty acid ester comprises two free hydroxy groups, and thus, may neutralize charging of polymer particles, and partially inactivate a cocatalyst additionally included in the catalyst, thereby reducing fine generation. Among the antistatic agents conventionally used for olefin polymerization, the glycerol fatty acid ester may reduce static electrification by polar functional groups, and decrease the formation of aggregate of polymer. Thus, when supported in a carrier together with the first metallocene compound, it may improve productivity through fine reduction. Such a fine reducing effect of the glycerol fatty acid ester may be further improved when used in combination with ethoxylated alkylamine, among the above described first antistatic agents.

The glycerol fatty acid ester may be, specifically, glycerol monostearate or glycerol monopalmitate, and the like, and one of the compounds or mixtures thereof may be used. And, commercially available glycerol fatty acid ester-based compounds may be also used, and for example, Atmer 129™ (manufactured by CRODA company) may be used as glycerol monostearate.

The metal salt of fatty acid may be, specifically, metallic stearate, such as aluminum stearate, zinc stearate, calcium stearate, magnesium stearate, and the like, and one of them or mixtures thereof may be used.

Meanwhile, in the present disclosure, the fatty acid may be $C_{8-22}$ saturated or unsaturated fatty acid, and more specifically, may be saturated or unsaturated fatty acid comprising linear or branched alkyl having carbon number of 8 or more, or 10 or more, or 12 or more, or 15 or more, or 16 or more, and 22 or less, or 20 or less, or 18 or less, and more specifically, saturated fatty acid comprising linear alkyl, and even more specifically, stearic acid or palmitic acid.

In the preparation method according to one embodiment of the invention, the second antistatic agent may comprise, more specifically, one or more selected from the group consisting of metallic stearate and glycerol stearic acid ester, such as aluminum stearate, glycerol monostearate.

The antistatic agent comprising the above described first and second antistatic agents may be included in the content of 0.5 to 5 wt %, based on the total weight of the metallocene-supported catalyst. If the content of the antistatic agent is less than 0.5 wt %, improvement effect according to the inclusion of the antistatic agent may be insignificant, and fine generation may increase, and thus, fouling may be generated. And, if the content of the antistatic agent is greater than 5 wt %, the content of the metallocene-based catalyst precursor may relatively decrease, and thus, catalytic activity may be lowered. More specifically, the content of the antistatic agent may be 0.5 wt % or more, or lwt % or more, or 1.5 wt % or more, and 5 wt % or less, or 4 wt % or less, or 3.5 wt % or less, or 3 wt % or less, or 2.5 wt % or less, or 2 wt % or less, based on the total weight of the metallocene-supported catalyst.

The antistatic agent may be introduced in the state of a solution diluted in a hydrocarbon-based solvent such as hexane, wherein the content of the antistatic agent in the solution may be appropriately selected considering the content of the antistatic agent in the metallocene-supported catalyst.

After introducing the antistatic agent, it may be reacted at a temperature of 20 to 60° C., more specifically, 20° C. or more, or 40° C. or more, and 60° C. or less, or 50° C. or less. Within the above temperature range, the reaction may be efficiently conducted without concern about side reactions.

As the result of the reaction, solvents in the mixture may be evaporated, and the prepared metallocene-supported catalyst may be obtained in the form of solid powder.

Since the metallocene-supported catalyst prepared by the above method comprises two kinds of antistatic agents, it may exhibit improved electrostatic properties. Thus, when olefin polymer is prepared using the metallocene-supported catalyst, fine generation may be decreased, polymerization stability may be improved, thereby preventing fouling in the reactor, and improving properties of polymer. Particularly, it may be useful for the preparation of linear low density polyethylene comprising LCB, by gas phase polymerization.

Thus, according to still another embodiment of the invention, there is provided a method for preparing polyethylene, comprising a step of polymerizing ethylene, in the presence of the above described metallocene-supported catalyst.

The metallocene-supported catalyst may be used in the form of solid powders, slurry mixed in a solvent, a solution diluted in a solvent, or a mud catalyst mixed with a mixture of oil and grease, according to the polymerization method. However, considering the flowability and electrostatic property improvement effects, it may realize more excellent effects in gas phase polymerization, and thus, it is preferably used in a solid state.

Meanwhile, the polymerization reaction for the preparation of polyethylene may be progressed by homopolymerization of ethylene monomers, or copolymerization of ethylene monomers and olefin monomers having carbon number of 3 or more, using a single continuous slurry polymerization reactor, loop slurry reactor, gas phase reactor or solution reactor. However, according to one embodiment, it is more appropriate that ethylene monomers are polymerized by gas phase polymerization, because more excellent effect may be realized.

The preparation of polyethylene may be progressed in a single-CSTR reactor. In the polymerization reactor, polymerization may be progressed in the presence of inert gas such as nitrogen. The inert gas inhibits rapid reaction of the metallocene catalyst at the beginning of polymerization, thereby maintaining reaction activity of the metallocene compound included in the catalyst.

During the polymerization reaction, hydrogen gas may be optionally further used so as to control molecular weight and molecular weight distribution of polyethylene.

Hydrogen gas activates the inactive sites of a metallocene catalyst, and causes chain transfer reactions to control molecular weight, and in case hydrogen gas is additionally introduced during a polymerization reaction, it may be introduced in an amount corresponding to 0.1 vol % or more, or 0.12 vol % or more, and 0.2 vol % or less, or 0.18 vol % or less, based on the total volume of ethylene monomers. In case hydrogen gas is introduced in the above content range, molecular weight of prepared polymer may decrease, thereby enhancing processability.

During the polymerization reaction, a temperature may be 70 to 100° C., more specifically 70° C. or more, or 80° C. or more, and 100° C. or less, or 90° C. or less. If the polymerization temperature is too low, it may not be appropriate in terms of polymerization speed and productivity, and thus, the polymerization temperature is preferably 70° C. or more, and if the polymerization temperature is excessively high, fouling may be induced in a reactor, and thus, it is preferable that the polymerization reaction is conducted at 100° C. or less.

During the polymerization reaction, a pressure may be 20 to 50 bar, more specifically, 20 bar or more, or 30 bar or more, and 50 bar or less, or 40 bar or less, so as to secure optimum productivity. The polymerization reaction pressure may be 20 bar or more so as to prevent blocking due to excessive production of high molecular weight components and optimize productivity, and may be 50 bar or less so as to prevent side reactions under high pressure condition.

In the polymerization reactor, an organic solvent may be additionally used as a reaction medium or diluent. Such an organic solvent may be used in such a content that slurry phase polymerization can be appropriately conducted, considering the content of ethylene monomers.

During the polymerization reaction, trialkyl aluminum such as triethylaluminum may be optionally further introduced.

If moisture or impurity exists in a polymerization reactor, a part of a catalyst may be decomposed, but the trialkyl aluminum serves as a scavenger for removing moisture or impurities existing in a reactor or moisture included in monomers beforehand, thus maximizing the activity of a catalyst used for preparation, thereby preparing homopolyethylene particularly having narrow molecular weight distribution with higher yield. Specifically, in the trialkyl aluminum, alkyl is as defined above, and specifically, is $C_{1-20}$ alkyl, more specifically, $C_{1-6}$ linear or branched alkyl, such as methyl, ethyl, isobutyl, and the like.

The trialkyl aluminum(on the basis of 1M) may be introduced in the content of 300ppm or more, or 400 ppm or more, and 1500 ppm or less, or 1350 ppm or less, based on the total weight of the monomers, and when polymerization is conducted in the presence of such a content range of trialkyl aluminum, homopolyethylene having excellent strength property may be more easily prepared.

In case the olefin monomers are introduced as comonomers, as the olefin monomers, alpha-olefin, cyclic olefin, diene olefin or triene olefin having 2 or more double bonds, and the like may be used.

As specific examples of the olefin monomers, ethylene, propylene, 1-butene, 1-pentene, 4-methyl-1-pentene, 1-hexene, 1-heptene, 1-octene, 1-decene, 1-undecene, 1-dodecene, 1 -tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, and the like may be mentioned, and two or more kinds of these monomers may be combined and copolymerized.

Polyethylene prepared by the above preparation method has lower bulk density and improved morphology, and has low fine content in the polymer, compared to the existing polyethylene.

Specifically, the polyethylene meets the following requirements of (a1) to (a4):

(a1) bulk density(BD) measured according to ASTM D1895-96: 0.45 g/cc or less, (a2) content of fines having particle sizes less than 75 μm: 1.3 wt % or less, based on the total weight of polyethylene (a3) average particle size(D50): 500 μm or more, and (a4) SPAN value according to the following Mathematical Formula 1: less than 1.

$$SPAN=(D90-D10)/D50 \quad \text{[Mathematical Formula 1]}$$

In the Mathematical Formula 1, D90, D10 and D50 respectively mean particle sizes at the 90%, 10% and 50% points in cumulative particle volume distribution according to particle size, when analyzing particle size distribution of polyethylene particles, and may be measured by a laser diffraction method. Specifically, polyethylene powders to be measured are introduced in the hopper of HELOS light diffraction particle size analyzer (manufactured by Sympatec GmbH) equipped with a free aero jet dry disperser for light diffraction, RODOS/M (dispersion nozzle diameter: 4 mm, vibrating sample feeder: VIBRI) (manufactured by Sympatec GmbH), and while setting a method in the range of 0.5 to 350 ,um, when the polyethylene particles pass through laser beam, difference in diffraction pattern according to particle size is measured and particle size distribution is analyzed, and from the results, particle sizes D90. D50 and D10 at 90%, 50% and 10% points in cumulative particle volume distribution according to particle size are respectively calculated.

Specifically, the polyethylene has bulk density measured according to ASTM D1895-96 of 0.45 g/cc or less, more specifically, 0.45 g/cc or less, or 0.44 g/cc or less or 0.43 g/cc or less, and 0.3 g/cc or more, or 0.31 g/cc or more, or 0.35g/cc or more, or 0.37g/cc or more, or 0.40 g/cc or more, or 0.41 g/cc or more, or 0.42 g/cc or more. Due to such a range of bulk density, productivity increasing effect may be exhibited.

The polyethylene has content of fines having particle size(P) less than 75 μm, of 1.3 wt % or less, more specifically, 1.25 wt % or less, or 1.15 wt % or less, or 1.1 wt % or less, or lwt % or less, or 0.9 wt % or less, or 0.85 wt % or less, or 0.8 wt % or less, or 0.7 wt % or less, or 0.6 wt % or less, or 0.5 wt % or less, based on the total weight of entire polyethylene particles. As such, there are little or no particles causing fines, with particle size less than 75 μm, generation of fouling by fines and the resulting unstability of a process may be prevented, and particle dissipation may be reduced during processing of a product. The lower fine content in the polyethylene is more preferable, but considering the preparation process, it may be greater than 0 wt %, or 0.0001 wt % or more, or 0.1 wt % or more.

Meanwhile, with regard to the content of fines having particle sizes less than 75 μm in the polyethylene, particle size distribution is analyzed by a laser diffraction method, and then, the weight of fines having particle sizes less than 75 μm is calculated, and the fine content is represented by percentage based on the total weight of polyethylene (wt %). Wherein, the particle size distribution analysis by laser diffraction may be conducted by the same method as the particle size distribution analysis of polyethylene particles as explained above.

The polyethylene has average particle size (D50) of 500 μm or more, more specifically, 500 μm or more, or 520 μm or more, or 550,um or more, or 560 μm or more, or 580 μm or more, or 600 μm or more, or 610 μm or more, or 620 μm or more, and 750 μm or less, or 700 μm or less, or 680 μm or less, or 660 μm or less, or 650 μm or less.

The polyethylene has a SPAN value according to the Mathematical Formula 1 of less than 1, specifically, 0.9 or less, 0.8 or less, or 0.7 or less, and 0.1 or more, or 0.3 or more, or 0.5 or more, or 0.6 or more.

As such, polyethylene has improved morphology such as average particle size (D50) and particle size uniformity, compared to the existing polyethylene, and thus, may exhibit improved properties.

For example, in case the metallocene-based catalyst precursor in the metallocene-supported catalyst prepared by the preparation method according to the invention comprises one or more metallocene compounds selected from the group consisting of a first metallocene compound represented by the Chemical Formula 4; and a second metallocene compound represented by the Chemical Formula 5, polyethylene prepared using the same may further meet one or more, 2 or more, or 3 or more, or 4 or more, or all of the following requirements (b 1) to (b6), in addition to the above requirements (a1) to (a4):

(b1) melt index (MI2.16) measured under conditions of 190° C., 2.16 kg load, according to ASTM D 1238: 0.2 to 1.1 g/10 min, (b2) melt flow rate ratio(MFRR; a value calculated by dividing MI21.6 measured under 190° C., 21.6 kg load according to ASTM D 1238, by MI2.16 measured under 190° C., 2.16 kg load according to ASTM D 1238): 50 to 90, (b3) density measured according to ASTM 765: 0.918 to 0.940 g/cm$^3$, (b4) weight average molecular weight (Mw): 90,000 to 120,000 g/mol, and (b5) polydispersity index (PDI): 2.5 to 3.3.

(b6) LCB number: 0.02 to 0.05/1000 C

Specifically, the polyethylene has a melt index measured under conditions of 190° C., 2.16kg load, according to ASTM D 1238, of 0.2 to 1.1 g/10min, more specifically, 0.2 g/10 min or more, or 0.25 g/10 min or more, or 0.28 g/10 min or more, or 0.3 g/10 min or more, or 0.33 g/10 min or more, and 1.1 g/10 min or less, or 0.8 g/10 min or less, or 0.5 g/10 min or less, or 0.37 g/10 min or less, or 0.35 g/10 min or less. By meeting the above range of MI, it may maintain excellent processability, and simultaneously, exhibit improved mechanical strength.

The polyethylene has a melt flow rate ratio (MFRR) calculated by dividing MI21.6 measured under 190° C., 21.6kg load according to ASTM D 1238, by MI2.16 measured under 190° C., 2.16kg load according to ASTM D 1238, of 50 to 90, more specifically, 50 or more, or 60 or more, or 65 or more, or 70 or more, and 90 or less, or 80 or less, or 75 or less, or 72.5 or less, or 72 or less. By meeting the above range of melt flow rate ratio, it may exhibit excellent processability, and in case the above melt index range is met together, excellent mechanical strength may be exhibited, and simultaneously, improved processability may be exhibited.

The polyethylene has density measured according to ASTM 765 of 0.918 to 0.940 g/cm$^3$, more specifically, 0.918 g/cm$^3$ or more, or 0.920 g/cm$^3$ or more, or 0.925 g/cm$^3$ or more, or 0.929 g/cm$^3$ or more, and 0.940 g/cm$^3$ or less, or 0.935 g/cm$^3$ or less, or 0.931 g/cm$^3$ or less. By meeting the above range of density, excellent mechanical strength, particularly impact resistance may be exhibited, and in case the above melt index and melt flow rate ratio are met together, improved mechanical strength and improved processability may be simultaneously exhibited.

The polyethylene has weight average molecular weight calculated by GPC analysis, of 90,000 to 120,000 g/mol, more specifically, 90,000 g/mol or more, or 95,000 g/mol or more, or 97,000 g/mol or more, or 99,000 g/mol or more, and 120,000 g/mol or less, or 110,000 g/mol or less, or 103,000 g/mol or less, or 100,000 g/mol or less. By meeting the above range of Mw, excellent mechanical strength may be exhibited.

The polyethylene has Mw/Mn ratio calculated using the Mw and Mn values obtained by GPC analysis, namely polydispersity index of 3.3 or less, more specifically, 3.3 or less, or 3.2 or less, or 3.1 or less, and 2.4 or more or 2.7 or more, or 2.9 or more, or 3.0 or more. By meeting such narrow molecular weight distribution, excellent mechanical strength may be exhibited.

Meanwhile, in the present disclosure, the weight average molecular weight and number average molecular weight of polyethylene may be measured using GPC (gel permeation chromatography, manufactured by Water company), and polydispersity index may be calculated by dividing the measured weight average molecular weight by the number average molecular weight. Specific measurement method will be explained in detail in experimental examples later.

And, the polyethylene has the number of long chain branch (LCB), a branch having a carbon number of 8 or more, bonded to a main chain, of 0.02 to 0.05/1000 C, wherein 1000 C means 1000 carbons constituting polyethylene. More specifically, the number of LCB may be 0.02/

1000 C or more, or 0.025/1000 C or more, or 0.03/1000 C or more, and 0.05/1000 C or less, or 0.04/1000 C or less, or 0.035/1000 C or less.

In the present disclosure, a long chain branch (LCB) of polyethylene means a chain bonded to the longest main chain in the form of branch in each polymer chain, specifically a chain having a carbon number of 8 or more, more specifically 8 to 500. The number of long chain branches may be calculated by analyzing polymer using high temperature GPC (PL-GPC220)-PerkinElmer Spectrum 100 FT-IR, or measuring with 13C-NMR. For example, in case FT-IR is used, polyethylene is dissolved in 1,2,4-trichlorobenzene containing 0.0125% BHT at 160° C., for 10 hours and pre-treated using PL-SP260, and then, using high temperature GPC(PL-GPC220)-PerkinElmer Spectrum 100 FT-IR, the content of branches per 1000 carbons may be measured at 160° C. And, in case 13C-NMR is used, a polyethylene sample is dissolved in TCE-d2(1,1,2,2-tetrachloroethane-d2) solvent and 13C-NMR is conducted, and the number of branches having carbon numbers of 8 or more included in 1000 carbons is analyzed and summed. Specific measurement method will be explained in detail in experimental example later.

Thus, the polyethylene prepared by the preparation method of the invention may be used for the preparation of a packaging container, a film, a sheet, an injection molded product, a fiber product, and the like, requiring low bulk density and low fine content, and particularly, is useful for the preparation of a shrink film.

Specifically, shrinkage (%) in TD (transverse direction, a direction vertical to a resin flow direction) of a film prepared using the polyethylene, measured by an oil bath method according to ASTM D 2732-14 (2020), is 15% or more, or 19% or more, and 25% or less, or 23% or less, or 20% or less.

Thus, according to still another embodiment of the invention, there are provided a polyethylene resin composition and a shrink film comprising polyethylene prepared by the above-described preparation method and meeting the above-described property requirements.

And, the shrink film may be prepared by a common shrink film preparation method, except comprising the above-described polyethylene.

Hereinafter, preferable examples will be presented for better understanding of the invention. However, these examples are presented only as the illustrations of the invention, and the scope of the invention is not limited thereby.

Hereinafter, the carrier used in each Example and Comparative Example is silica meeting the following requirements.

1) average particle size(D50): 40 μm, 2) pore volume: 1.32 ml/g, and

3) TVOC content: 3 wt %, based on the total weight of silica.

The average particle size (D50) of the silica carrier was calculated as follows: The silica carrier was introduced in the state of powders in the hopper of HELOS light diffraction particle size analyzer (manufactured by Sympatec GmbH) equipped with a free aero jet dry disperser for light diffraction, RODOS/M (dispersion nozzle diameter: 4 mm, vibrating sample feeder: VIBRI) (manufactured by Sympatec GmbH), and while setting a method in the range of 0.5 to 350 μm, when the silica carrier particles passed through laser beam, difference in diffraction pattern according to particle size was measured and particle size distribution was analyzed, and from the results, particle size D50 at 50% point in cumulative particle volume distribution according to particle size was calculated.

The pore volume of the silica carrier was measured using BET measuring device (Belsorp max model, manufactured by MicrotracBEL company). If the silica carrier sample was loaded in the measuring device, the amount of gas adsorbed and desorbed to the sample is measured on the basis of relative pressure, and from the measurement value of gas amount and the mass of the sample, pore volume per unit mass of the sample is automatically measured and calculated.

The TVOC content of the silica carrier was measured using TGA 4000 thermo-gravimetry (manufactured by Perkin Elmer), and specifically, the temperature of the silica carrier sample was raised from room temperature (25° C.) to 900° C. under nitrogen atmosphere, and then, mass loss generated in the silica carrier sample was measured, and TVOC content was calculated therefrom (nitrogen flow rate: 60-70 ml/min).

EXAMPLE 1

(1) Preparation of a Supported Catalyst 0.6 g (corresponding to one equivalent, based on one equivalent of introduction amount of a metallocene-based catalyst precursor) of triisobutylaluminum (TIBAL) was added to 50 ml of hexane, and then, 0.3 g ((corresponding to one equivalent, based on one equivalent of introduction amount of a metallocene-based catalyst precursor, mole ratio of TIBAL:MTBE =1:1) of methyl tert-butyl ether (MTBE) was added and reacted at 40° C. for 1 hour. To the obtained reaction mixture, 10 g of a silica carrier (average particle diameter (D50): 40 μm, pore volume: 1.32 ml/g, TVOC content: 3 wt % based on the total weight of silica) was introduced, and stirred at 40° C. for 1 hours, and then, 75g of methylaluminoxane (MAO, 10 wt % in toluene, corresponding to 16 mmol based on lg of the silica carrier) was introduced, and stirred and reacted at 80° C. for more than 5 hours. To the obtained reaction mixture, 3 mmol of a mixture of a first metallocene compound (A) and a second metallocene compound (B) of the following structures was introduced as a metallocene-based catalyst precursor (mole ratio of A:B=2:1) (the total amount of the catalyst precursor supported corresponds to 0.076 mmol, based on lg of the silica carrier), and reacted at 50° C. The obtained reaction mixture was filtered with a filter, and the filtrate was separated and removed. To the residue, an antistatic agent (a mixture of N,N-bis(2-hydroxyethyl)octadecylamine (BHOA) and glycerol monostearate (GMS) at the weight ratio of 65:35) diluted in hexane was added in such an amount to become 2.0 wt %, based on the total weight of a metallocene-supported catalyst, and reacted at 50° C. for 30 minutes.

The obtained reaction mixture was filtered with a filter, the filtrate was separated and removed, and the residue was dried to prepare a solid metallocene-supported catalyst.

(A)

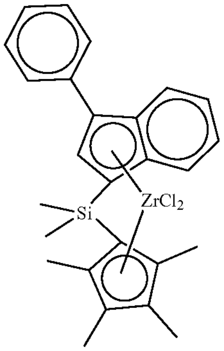

(B)

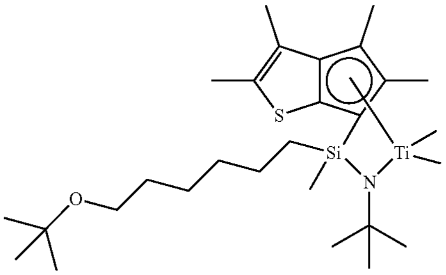

(2) Preparation of Polyethylene

In a 2 L autoclave, 500 g of NaCl was introduced as seed bed, and while stirring, ethylene ($C_2$), hydrogen ($H_2$) and 1-hexebe (1-$C_6$) were introduced. Each flow rate was controlled according to a target product, and the concentrations of gases and comonomer 1-hexene were confirmed by on-line gas chromatograph.

30 mg of the metallocene-supported catalyst prepared above was introduced in the form of dry powders, and a polymerization reaction was conducted under reactor pressure of about 40 bar and polymerization temperature of about 85° C. After reaction for 1 hour, stirring was stopped, and all the internal gases were vented, and then, the obtained reaction mixture and seed bed were recovered. The seed bed was dissolved in water to remove, and the resulting solid was recovered and dried to obtain ethylene/1-hexene copolymer as polyethylene.

EXAMPLES 2 TO 17, AND COMPARATIVE EXAMPLES 1 TO 6

Supported catalysts and ethylene/1-hexene copolymers were prepared by the same method as Example 1, except that supported catalysts were prepared under conditions described in the following Table 1.

TABLE 1

| | Carrier pre-treatment material | | | Metallocene-based catalyst precursor | | Antistatic agent | | | |
|---|---|---|---|---|---|---|---|---|---|
| | Alkyl aluminum-based compound (eq) | Ether-based compound (eq) | Mole ratio of alkyl aluminum-based compound: ether-based compound | Kind of precursor | Mixing mole ratio | First antistatic agent | Second antistatic agent | Weight ratio of first: second antistatic agents | Amount of antistatic agent (wt %) |
| Example 1 | TIBAL (1) | MTBE (1) | 1:1 | A,B | 2:1 | BHOA | GMS | 65:35 | 2.0 |
| Example 2 | TIBAL (1) | MTBE (1) | 1:1 | A,B | 2:1 | BHOA | GMS | 65:35 | 1.5 |
| Example 3 | TIBAL (1) | MTBE (1) | 1:1 | A,B | 2:1 | BHOA | AS | 65:35 | 1.5 |
| Example 4 | TIBAL (1) | MTBE (1) | 1:1 | A,B | 2:1 | BHOA | GMS | 70:30 | 2.0 |
| Example 5 | TIBAL (1) | MTBE (2) | 1:2 | A,B | 2:1 | BHOA | GMS | 65:35 | 2.0 |
| Example 6 | TIBAL (1) | MTBE (2) | 1:2 | A,B | 2:1 | BHOA | AS | 65:35 | 1.5 |
| Example 7 | TIBAL (1) | MTBE (1) | 1:1 | C,D | 2:1 | BHOA | GMS | 65:35 | 2.0 |
| Example 8 | TIBAL (1) | MTBE (2) | 1:2 | E,F | 2:1 | BHOA | GMS | 65:35 | 2.0 |
| Example 9 | TIBAL (1) | ETBE (1) | 1:1 | A,B | 2:1 | BHOA | GMS | 65:35 | 2.0 |
| Example 10 | TIBAL (1) | MTBE (1) | 1:1 | A,B | 2:1 | DBSA | GMS | 65:35 | 2.0 |
| Example 11 | TIBAL (1) | MTBE (1) | 1:1 | A,B | 2:1 | BHOA | GMS | 65:35 | 3.5 |
| Example 12 | TIBAL (1) | MTBE (1) | 1:1 | A,B | 2:1 | BHOA | — | 100:0 | 2.0 |
| Example 13 | TIBAL (1) | MTBE (1) | 1:1 | A,B | 2:1 | — | GMS | 0:100 | 2.0 |
| Example 14 | TIBAL (1) | MTBE (1) | 1:1 | A,B | 2:1 | BHOA | GMS | 65:35 | 0.3 |
| Example 15 | Tri-t-butyl Al (1) | MTBE (1) | 1:1 | A,B | 2:1 | BHOA | GMS | 65:35 | 2.0 |
| Example 16 | TIBAL (1) | MTBE (1) | 1:1 | A,B | 1:1 | BHOA | GMS | 65:35 | 2.0 |
| Example 17 | TIBAL (1) | MTBE (1) | 1:1 | A,B | 2:1 | — | — | — | — |
| Comparative Example 1 | TIBAL (1) | — | 1:0 | A,B | 2:1 | BHOA | GMS | 65:35 | 2.0 |
| Comparative Example 2 | TIBAL (1) | THF (1) | 1:1 | A,B | 2:1 | BHOA | GMS | 65:35 | 2.0 |
| Comparative Example 3 | — | — | — | A,B | 2:1 | BHOA | GMS | 65:35 | 2.0 |
| Comparative Example 4 | — | — | — | A,B | 2:1 | — | — | — | — |
| Comparative Example 5 | TEAL (1) | MTBE (1) | 1:1 | A,B | 2:1 | BHOA | GMS | 65:35 | 2.0 |
| Comparative Example 6 | TEAL (1) | MTBE (1) | 1:1 | C,D | 2:1 | — | — | — | — |

In the Table 1, the amount unit 'eq' of carrier pretreatment material means an equivalent value, based on one equivalent of the introduction amount of the metallocene-based catalyst precursor.

The amount unit 'wt %' of an antistatic agent represents the weight of the antistatic agent as percentage based on the total weight of a metallocene-supported catalyst.

Abbreviations in the Table are as follows:

TIBAL: triisobutylaluminum

TEAL: triethylaluminum

Tri-t-butyl Al: tri t-butylaluminum

MTBE: methyl-t-butylether

ETBE ethyl-t-butylether

BHOA: N,N-bis(2-hydroxyethyl)octadecylamine

GMS: glycerol monostearate

AS: aluminum stearate

DB SA: dodecylbenzenesulfonic acid

Catalyst precursors A, B, C, D, E and F used in Examples and Comparative Examples are compounds having the following structures.

(A)

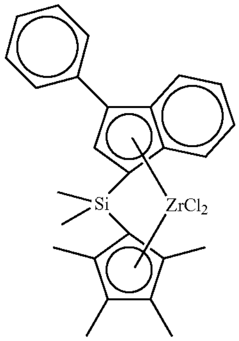

(B)

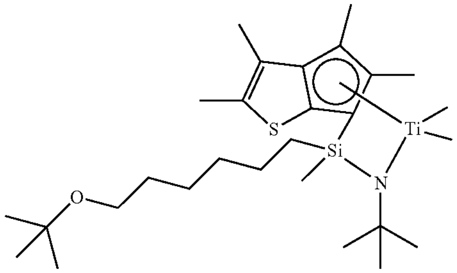

(C)

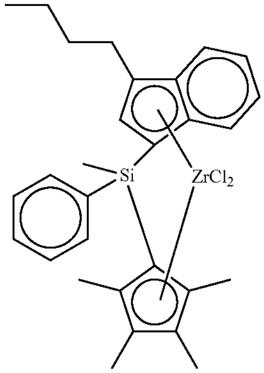

-continued (D)

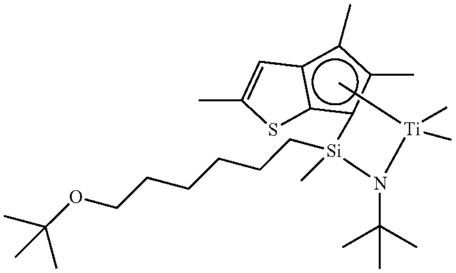

(E)

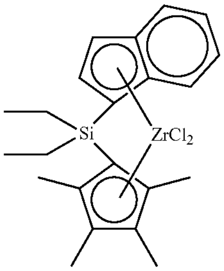

(F)

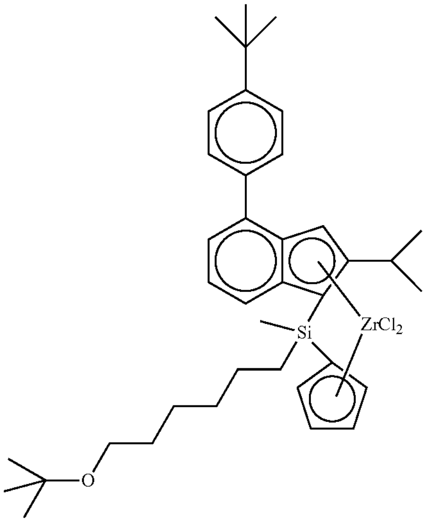

EXPERIMENTAL EXAMLPE 1

Polyethylenes prepared in Example 1 and Comparative Example 4 were observed with scanning electron microscope (SEM), and the results were respectively shown in FIG. 1*a* to FIG. 2*b*.

As the result of observation, polyethylene prepared according to Example 1 had spherical particle shape, and exhibited improved morphology compared to polyethylene prepared according to Comparative Example 4

EXPERIMENTAL EXAMLPE 2

The influence of the mixing ratio of the first and second antistatic agents in an antistatic agent on catalytic activity and fine generation was evaluated.

Specifically, a metallocene-supported catalyst and polyethylene were prepared by the same method as Example 1, except using BHOA as the first antistatic agent and GMS as the second antistatic agent while changing the mixing weight ratio to 0:100, 10:90, 20:80, 30:70, 40:60, 50:50, 60:40, 65:35, 70:30, 75:25, 80:20, 90:10, 100:0, and catalytic activity and the amount fine generated were measured.

(1) Catalytic Activity (kgPE/g·cat·h)

Catalytic activity was calculated as the rate of weight(kg) of prepared polymer to the weight(g) of a catalyst used, per unit time(h).

(2) Content of Fines Having Particle Size Less Than 75 μm

Polyethylene particles were introduced in the hopper of HELOS light diffraction particle size analyzer (manufactured by Sympatec GmbH) equipped with a free aero jet dry disperser for light diffraction, RODOS/M (dispersion nozzle diameter: 4 mm, vibrating sample feeder: VIBRI) (manufactured by Sympatec GmbH), and while setting a method in the range of 0.5 to 350 μm, when the polyethylene particles passed through laser beam, difference in diffraction pattern according to particle size was measured and particle size distribution was analyzed, and from the results, the weight of fines having particle sizes less than 75 μm was calculated, and then, represented as percentage based on the total weight of polyethylene (wt %).

The measurement results were shown in the following Table 2.

TABLE 2

| Mixing weight ratio of first antistatic agent:second antistatic agent | Catalytic activity (kgPE/g · cat · h) | Content of fines having particle size less than 75 μm (wt %) |
|---|---|---|
| 0:100 | 4.0 | 1.12 |
| 10:90 | 4.4 | 1.10 |
| 20:80 | 4.7 | 1.01 |
| 30:70 | 4.9 | 0.83 |
| 40:60 | 5.5 | 0.72 |
| 50:50 | 5.8 | 0.64 |
| 60:40 | 6.9 | 0.58 |
| 65:35 | 7.3 | 0.50 |
| 70:30 | 6.8 | 0.56 |
| 75:25 | 6.2 | 0.69 |
| 80:20 | 5.8 | 0.77 |
| 90:10 | 5.6 | 0.95 |
| 100:0 | 5.5 | 1.24 |

As the results of experiment, while the content of the first antistatic agent in the mixture of first antistatic agent and second antistatic agent increases from the weight ratio of the first antistatic agent and second antistatic agent of 0:100 to 65:35, catalytic activity tended to increase, and fine content tended to decrease. However, in case the content of the first antistatic agent further increases such that the mixing ratio of the first antistatic agent and second antistatic agent are greater than 65:35, catalytic activity tended to decrease, and fine content tended to increase. Thus, it can be seen that more excellent effects of increasing catalytic activity and decreasing fine content may be realized by controlling the mixing ratio of the first antistatic agent and second antistatic agent. Specifically, when the mixing weight ratio of the first antistatic agent and second antistatic agent is 60:40 to 70:30, high catalytic activity may be exhibited, and simultaneously, the amount of fine generated may be significantly reduced to 0.6 wt % or less.

EXPERIMENTAL EXAMLPE 3

When preparing polyethylene according to Examples and Comparative Examples, the activity of the catalysts used, and the properties of prepared polyethylene were evaluated as follows, and the results were shown in the following Table 3.

(1) Catalytic activity (kgPE/g·cat·h): calculated as the ratio of the weight(kg) of prepared polymer to the weight(g) of a catalyst used, per unit time(h).

(2) Bulk density (BD) (g/cc): measured according to ASTM D1895-96.

Specifically, using a bulk density measuring device IPT model 1132 (manufactured by IPT Institut fur Pruftechnik Geratebau GmbH & Co), the weight (g) of polyethylene included in a 100 mL container was measured, and bulk density was calculated therefrom.

(3) Average particle size (D50) and particle size distribution (SPAN) of polyethylene Polyethylene particles were introduced in the hopper of HELOS light diffraction particle size analyzer (manufactured by Sympatec GmbH) equipped with a free aero jet dry disperser for light diffraction, RODOS/M (dispersion nozzle diameter: 4 mm, vibrating sample feeder: VIBRI) (manufactured by Sympatec GmbH), and while setting a method in the range of 50 to 3500 ,um, when the polyethylene particles passed through laser beam, difference in diffraction pattern according to particle size was measured and particle size distribution was analyzed.

From the analysis results, particle sizes D90. D50 and D10 at 90%, 50% and 10% points in cumulative particle volume distribution according to particle size were respectively calculated, and using the same, SPAN was calculated according to the following Mathematical Formula 1.

$$SPAN=(D90-D10)/D50 \quad \text{[Mathematical Formula 1]}$$

In the Mathematical Formula 1, D90, D10 and D50 respectively mean particle sizes at 90%, 10% and 50% points in cumulative particle volume distribution according to particle size, when analyzing particle size distribution of polyethylene particles.

(4) Content of fines having particle sizes less than 75 μm

From the particle size analysis result of (3), the weight of fines having particle sizes less than 75 μm were calculated, and the content of fines were represented as percentage based on the total weight of polyethylene (wt %).

(5) Chunk Content

Using a sieve, among the polyethylene prepared in Examples and Comparative Examples, polyethylene chunks having particle sizes of 2000 μm or more were separated and the weight was measured, and the content of polyethylene chunks having particle sizes of 2000 μm or more was represented as percentage, based on the total weight of polyethylene (wt %).

TABLE 3

| | | Polyethylene | | | | |
|---|---|---|---|---|---|---|
| | Catalytic activity (kgPE/g · cat · h) | Chunk content (wt %) | BD (g/cc) | Content of fines having particle sizes less than 75 μm (wt %) | D50 (μm) | SPAN |
| Example 1 | 7.3 | 0 | 0.42 | 0.50 | 650 | 0.6 |
| Example 2 | 7.2 | 0.2 | 0.40 | 0.83 | 630 | 0.6 |

TABLE 3-continued

| | Catalytic activity (kgPE/g · cat · h) | Polyethylene Chunk content (wt %) | BD (g/cc) | Content of fines having particle sizes less than 75 μm (wt %) | D50 (μm) | SPAN |
|---|---|---|---|---|---|---|
| Example 3 | 7.0 | 2 | 0.40 | 0.55 | 630 | 0.7 |
| Example 4 | 7.0 | 0.4 | 0.40 | 0.56 | 600 | 0.6 |
| Example 5 | 6.7 | 1 | 0.42 | 0.69 | 620 | 0.6 |
| Example 6 | 6.6 | 2.2 | 0.41 | 0.79 | 660 | 0.7 |
| Example 7 | 8.2 | 0 | 0.42 | 0.70 | 680 | 0.5 |
| Example 8 | 7.5 | 0.2 | 0.43 | 0.85 | 650 | 0.6 |
| Example 9 | 6.4 | 1.5 | 0.42 | 0.6 | 620 | 0.6 |
| Example 10 | 7.5 | 2 | 0.42 | 0.57 | 650 | 0.9 |
| Example 11 | 6.3 | 0.5 | 0.39 | 0.72 | 610 | 0.8 |
| Example 12 | 5.5 | 0 | 0.38 | 1.24 | 560 | 0.9 |
| Example 13 | 4.0 | 2 | 0.37 | 1.12 | 520 | 0.9 |
| Example 14 | 7.1 | 0.5 | 0.31 | 1.25 | 520 | 0.9 |
| Example 15 | 6.4 | 0.3 | 0.39 | 0.77 | 600 | 0.6 |
| Example 16 | 5.9 | 0 | 0.4 | 0.53 | 650 | 0.6 |
| Example 17 | 6.9 | 2 | 0.42 | 0.4 | 630 | 0.7 |
| Comparative Example 1 | 5.9 | 0 | 0.36 | 1.32 | 570 | 1.0 |
| Comparative Example 2 | 5.5 | 0.3 | 0.35 | 1.62 | 530 | 1.3 |
| Comparative Example 3 | 5.5 | 0.3 | 0.35 | 1.50 | 380 | 0.8 |
| Comparative Example 4 | 5.9 | 2.5 | 0.32 | 2.53 | 370 | 1.3 |
| Comparative Example 5 | 5.2 | 0.4 | 0.38 | 2.30 | 570 | 1.1 |
| Comparative Example 6 | 4.9 | 2.4 | 0.35 | 1.73 | 450 | 1.1 |

As the result of experiment, in case polyethylene was prepared without pretreatment or without using an antistatic agent as in the prior art, the amount of fines generated was large, particle size of prepared polyethylene was small, and particle uniformity was also low (see Comparative Example 4). In case an antistatic agent is introduced so as to solve the problem, the amount of fines generated decreased, but the antistatic agent inactivated a catalyst to lower catalytic activity, and the inactivated catalyst caused fine generation, thus marring the effect of decreasing fine generation according to the use of an antistatic agent (Comparative Example 3).

However, in case pretreatment was conducted by the preparation method according to the invention as in Example 17, the amount of fines generated significantly decreased without using an antistatic agent. Example 17 exhibited further improved catalytic activity due to the pretreatment during the preparation of a supported catalyst, and as the result, polyethylene having increased average particle size compared to Comparative Examples, and simultaneously, having uniform particle size distribution with SPAN of 0.7 was prepared.

Meanwhile, in the case of Comparative Example 6 wherein pretreatment was conducted but triethylaluminum was used as an alkyl aluminum-based compound, compared to Comparative Example 4, the amount of fines generated decreased, and the average particle size of prepared polyethylene and SPAN were improved, but compared to Example 17, the amount of fines generated, the average particle size of prepared polyethylene, SPAN and chunk generation were all deteriorated. This is because triethylaluminum exhibited large attractive force to the monoether-based compound having aliphatic chains compared to triisobutylaluminum used in Example 17, and non-uniformly distributed and bonded to the carrier, thereby lowering pretreatment effect.

In the case of Comparative Example 5 wherein pretreatment was conducted by the same method as Comparative Example 6 and an antistatic agent is additionally treated, despite the treatment with an antistatic agent, the amount of fines generated more increased to the contrary.

Comparing Examples 1, 9, 15 and Comparative Examples 1, 2, 5 wherein only the pretreatment conditions were varied, in Examples 1, 9 and 15 wherein metallocene-supported catalysts were prepared by the preparation method according to the invention, compared to Comparative Examples, excellent catalytic activities were exhibited, and simultaneously, fine content significantly decreased to less than lwt %. And, the average particle size of prepared polyethylene was larger (600 μm or more), and SPAN was remarkably small (0.6). From these results, it can be seen that when the pretreatment conditions of the invention are met when preparing a metallocene-supported catalyst, the effects of improving catalytic activity and decreasing fine generation may be simultaneously realized, and the properties of prepared polyethylene may also be improved.

From the results of Examples 2-8, 10-14 and 16, it was confirmed that although the effects may vary according to the kind, amount and mixing mole ratio of the antistatic agent and metallocene compound when preparing a metallocene-supported catalyst, the effects of improving catalytic activity and decreasing fine generation were excellent, compared to Comparative Examples wherein pretreatment was not conducted or pretreatment conditions were not met. And, from the result, it can be seen that through the optimization of the kind, amount and mixing mole ratio of the antistatic agent and metallocene compound, the effects of improving catalytic activity and decreasing fine generation may be further enhanced, and the average particle size and uniformity of polyethylene prepared may be further improved.

EXPERIMENTAL EXAMLPE 4

The properties of polyethylene prepared in Examples 1, 7 and 8 and films prepared using the same were respectively measured, and evaluated. The results were shown in the following Table 4.

(1) Melt index ($MI_{2.16}$) and melt flow rate ratio (MFRR)

Melt Index ($MI_{2.16}$) was measured according to ASTM D1238 (condition E, 190° C., 2.16 kg load), and represented as the weight(g) of polymer molten and flowed out for 10 minutes.

Melt flow rate ratio (MFRR) was calculated by dividing $MI_{21.6}$ by $MI_{21.6}$, wherein $MI_{21.6}$ was measured under temperature of 190° C. and load of 21.6 kg according to ASTM D1238, and $MI_{2.16}$ was measured under temperature of 190° C. and load of 2.16 kg according to ASTM D1238.

(2) Density (g/cm$^3$)

The density of polyethylene was measured according to ASTM 765.

(3) Weight Average Molecular Weight (Mw) and Polydispersity (PDI)

For the polyethylene of Examples, weight average molecular weight (Mn) and number average molecular weight (Mn) were measured by GPC (gel permeation chromatography), and polydispersity index (Mw/Mn) was calculated by dividing the weight average molecular weight by the number average molecular weight.

Specifically, as GPC device, PL-GPC220 manufactured by Waters Corp. was used, and PLgel MIX-B column (length 300 mm) manufactured by Polymer Laboratories Company was used. Wherein, measurement temperature was 160° C., 1,2,4-trichlorobenzene was used as a solvent, and flow rate was 1 mL/min. Using sample pretreatment system PL-SP260 (Agilent Technology), 10 mg of the polyethylene sample of Examples was dissolved in 1,2,4-trichlorobenzene containing 0.0125% of BHT at 160° C. for 10 hours and pretreated, and prepared at the concentration of 10 mg/10 mL, and then, fed in an amount of 200 μL. Using a calibration curve formed using polystyrene standard specimen, Mw and Mn values were derived. 9 kinds of polystyrene standard specimens each having weight average molecular weight of 2,000g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol were used.

(4) LCB (Long Chain Branch) Content

For the polyethylene prepared in Examples and Comparative Examples, using high temperature GPC (PL-GPC220)-PerkinElmer Spectrum 100 FT-IR, the content of long chain branches (LCB) having carbon numbers of 8 or more, bonded to the longest main chain in the form of branches, was measured in each polymer chain.

Specifically, using PL-SP260, polyethylene was dissolved in 1,2,4-trichlorobenzene containing 0.0125% of BHT at 160° C. for 10 hours and pretreated, and then, using high temperature GPC (PL-GPC220)-PerkinElmer Spectrum 100 FT-IR, the number of LBC having carbon numbers of 8 or more, included in 1,000 carbons, was measured at 160° C. (unit: number/1000 C).

TABLE 4

| | | Example 1 | Example7 | Example8 |
|---|---|---|---|---|
| Basic properties | $MI_{2.16}$ (g/10 min) | 0.33 | 0.37 | 0.28 |
| | MFRR | 72.0 | 65.3 | 72.1 |
| | Density | 0.931 | 0.929 | 0.929 |
| | Mw (g/mol) | 99,000 | 97,000 | 103,000 |
| | PDI | 2.9 | 3.1 | 3.2 |
| | LCB number (/1000 C.) | 0.032 | 0.035 | 0.030 |

As the result of experiment, each polyethylene of Examples 1, 7 and 8 exhibited low MI and density, high Mw, narrow PDI and high LCB content, and from such properties of polyethylene, it can be seen that the polyethylene of Examples 1, 7 and 8 are useful for the preparation of a film, particularly a shrink film.

The invention claimed is:

1. A method for preparing a metallocene-supported catalyst, comprising:

pre-treating a carrier with an alkyl aluminum-based compound represented by the following Chemical Formula 1 and a monoether-based compound having aliphatic chains;

introducing a cocatalyst in the pre-treated carrier and reacting them, to support the cocatalyst in the pre-treated carrier to produce a cocatalyst-supported carrier;

introducing a metallocene-based catalyst precursor in the cocatalyst-supported carrier and reacting them, supporting the metallocene-based catalyst precursor in the cocatalyst-supported carrier: and introducing an antistatic agent in the carrier in which the metallocene-based catalyst precursor is supported, and reacting them, wherein the antistatic agent comprises one or more first antistatic agents selected from the group consisting of ethoxylated alkylamine-based compounds and sulfonic acid-based compounds; and one or more second antistatic agents selected from the group consisting of fatty acid ester and fatty acid metal salts:

$Al(R)_3$ Chemical Formula 1 wherein, in Chemical Formula 1, each R is independently $C_{3-20}$ branched alkyl.

2. The method for preparing a metallocene-supported catalyst according to claim 1, wherein the alkyl aluminum-based compound comprises triisopropylaluminum, triisobutylaluminum, tri-t-butylaluminum, triisopentylaluminum, or trineopentylaluminum.

3. The method for preparing a metallocene-supported catalyst according to claim 1, wherein the monoether-based compound having aliphatic chains comprises methyl t-butylether, ethyl t-butylether, propyl t-butylether, or sec-butyl t-butylether.

4. The method for preparing a metallocene-supported catalyst according to claim 1, wherein the alkyl aluminum-based compound and the monoether-based compound having aliphatic chains are used at a mole ratio of 1:0.5 to 1:3.

5. The method for preparing a metallocene-supported catalyst according to claim 1, wherein the pre-treatment is conducted by reacting the alkyl aluminum- based compound and the monoether-based compound having aliphatic chains, and then, introducing the carrier and reacting them.

6. The method for preparing a metallocene-supported catalyst according to claim 1, wherein the first antistatic agent comprises one or more compounds selected from the group consisting of N,N-bis(2-hydroxyethyl)tridecylamine, N,N-bis(2-hydroxyethyl)pentadecylamine, N,N-bis(2-hydroxyethyl)octadecylamine, dodecylbenzenesulfonic acid, toluenesulfonic acid, camphor sulfonic acid, benzenesulfonic acid, and styrenesulIonic acid, and the second antistatic agent comprises one or more compounds selected from the group consisting of glycerol monostearate, glycerol monopalmitate, methyl stearate, ethyl stearate, propyl stearate, butyl stearate, aluminum stearate, zinc stearate, calcium stearate, and magnesium stearate.

7. The method for preparing a metallocene-supported catalyst according to claim 1, wherein the antistatic agent comprises the first antistatic agent and the second antistatic agent at a weight ratio of 10:90 to 90:10.

8. The method for preparing a metallocene-supported catalyst according to claim 1, wherein metallocene-supported catalyst comprises the antistatic agent in the amount of 0.5 to 5 wt % based on a total weight of the metallocene-supported catalyst.

9. The method tor preparing a metallocene-supported catalyst according to claim 1, wherein the carrier comprises silica, and the cocatalyst comprises one or more alkylaluinoxane-based compounds selected from the group consisting of methylaluminoxane, ethylaluminoxane, propylaluminoxane, and butylaluminoxane.

10. The method for preparing a metallocene-supported catalyst according to claim 1, wherein the metallocene-based catalyst precursor comprises one or more metallocene compounds selected from the group consisting of a first metallocene compound represented by the following Chemical Formula 4; a second metallocene compound represented by the following Chemical Formula 5:

Chemical Formula 4

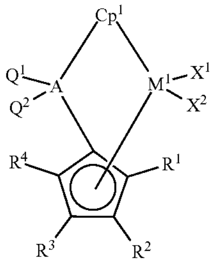

wherein in Chemical Formula 4, $M^1$ is Group 4 transition metal;

A is carbon, silicon, or germanium;

$Cp^1$ is indenyl, and is substituted with one or more substituents selected from the group consisting of hydrogen, a C1-30 hydrocarbyl group, a C1-30 hydrocarbyloxy group, a C2-30 hydrocarbyloxyhydrocarbyl group, a C1-20 hydrocarbyl(oxy)silyl group, and a C1-20 silylhydrocarbyl group, or unsubstituted, $R^1$ to $R^4$ are identical to or different from each other, and each independently, hydrogen a C1-30 hydrocarbyl group, a C1-30 hydrocarbyloxy group, or a C2-30 hydrocarbyloxyhydrocarbyl group;

$Q^1$ and $Q^2$ are identical to or different from each other, and each independently, a C130 hydrocarbyl group, a C1-30 hydrocarbyloxy group or a C2-30 hydrocarbyloxyhydrocarbyl group; and $X^1$ and $X^2$ are identical to or different bom each other, and each independently, halogen, a nitro group, an amido group, a phosphine group, a phosphide group, a C1-30 hydrocarbyl group, a C1-30 hydrocarbyloxy group, a C2-30 hydrocarbyloxyhydrocarbyl group, —$SiH_3$, a C1-30 hydrocarbyl(oxy)silyl group, a C1-30 sulfonate group, or a C1-30 sulfone group;

Chemical Formula 5

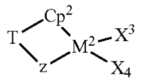

wherein in Chemical Formula 5, $M^2$ is Group 4 transition metal;

$X^3$ and $X^4$ are identical to or different from each other; and each independently, halogen, a nitro group, an axmdo group, a phosphine group, a phosphide group, a C1-30 hydrocarbyl group, a C1-30 hydrocarbyloxy group, a C2-30 hydrocarbyloxyhydrocarbyl group, —$SiH_3$, a C1-30 hydrocarbyl(oxy)silyl group, a C1-30 sulfonate group, or a C1-30 sulfone group;

Z is —O—, —S—, —$NR^5$—, or —$PR^6$—, $R^5$ and $R^6$ are each independently, hydrogen, a C1-20 hydrocarbyl group, a C1-20 hydrocarbyl(oxy)silyl group, or a C1-20 silylhydrocarbyl group;

T is

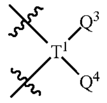

or

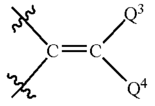

, $T^1$ is C, Si, Ge, Sn or Pb, $Q^3$ is hydrogen, a C1-30 hydrocarbyl group, a C1-30 hydrocarbyloxy group, a C2-30 hydrocarbyloxyhydrocarbyl group, —$SiH_3$, a C1-30 hydrocarbyl(oxy)silyl group, a C1-30 hydrocarbyl group substituted with halogen, or —$NR^7R^8$, $Q^4$ is a C2-30 hydrocarbyloxyhydrocarbyl group, $R^7$ and $R^8$ are each independently, one of hydrogen and a C1-30 hydrocarbyl group, or they are linked to each other to form an ahphatic or aromatic ring;

$Cp^2$ is one of ligands represented by the following Chemical formulas 6a to 6d, Chemical Formula 6a

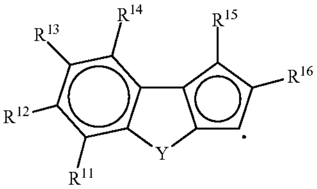

Chemical Formula 6b

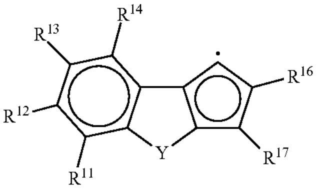

-continued

Chemical Formula 6c

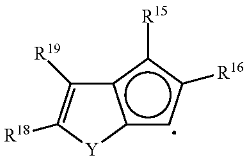

Chemical Formula 6d

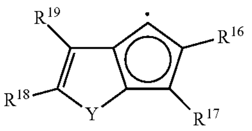

wherein in Chemical Formulas 6a to 6d,

Y is O or S, $R^{11}$ to $R^{19}$ are identical to or different from each other, and are each independently, hydrogen, a C1-30 hydrocarbyl group, or a C1-30 hydrocaxbyloxy group,

• denotes a site bonding to T.

11. The method for preparing a metallocene-supported catalyst according to claim 10, wherein the first metallocene compound is selected from the group consisting of the following compounds 4a to 4p, and the second metallocene compound is selected from the group consisting of the following compounds 5a to 5c:

(4a)

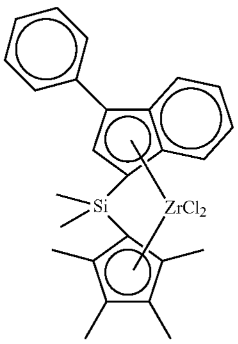

(4b)

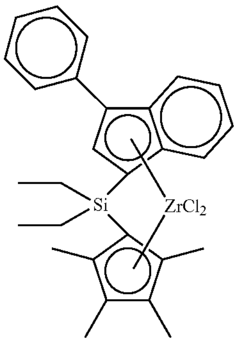

-continued (4c)

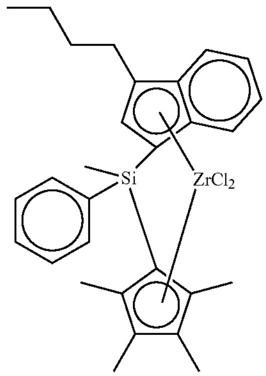

(4d)

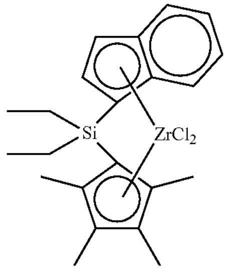

(4e)

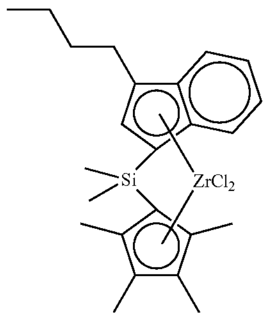

(4f)

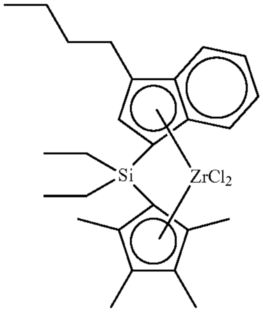

(4g)

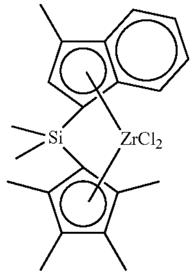

-continued
(4h)
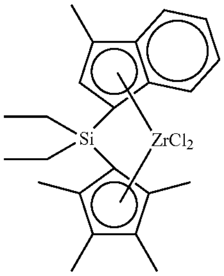
(4i)
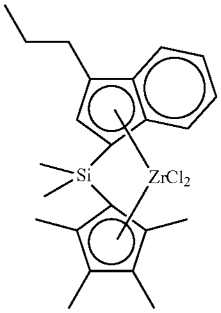
(4j)
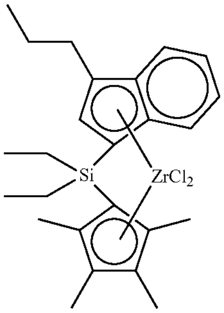
(4k)
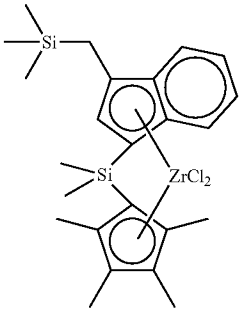
(4l)
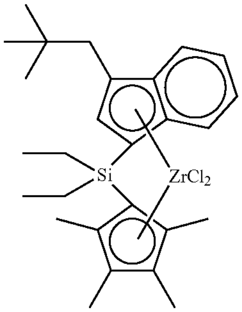
-continued
(4m)
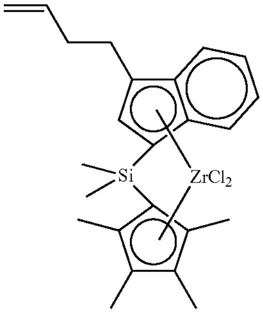
(4n)
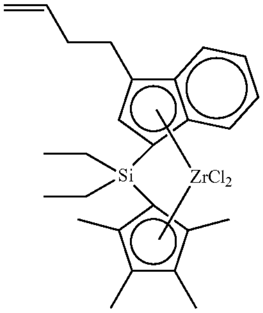
(4o)
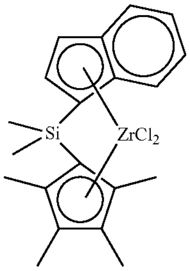
(4p)
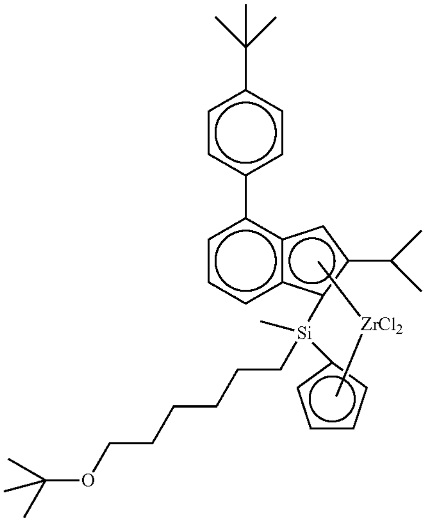

-continued (5a)

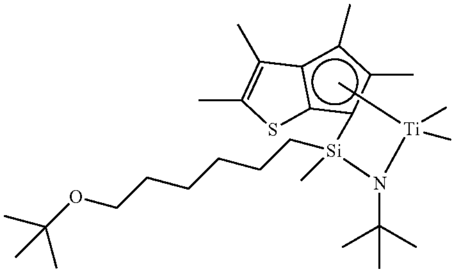

(5b)

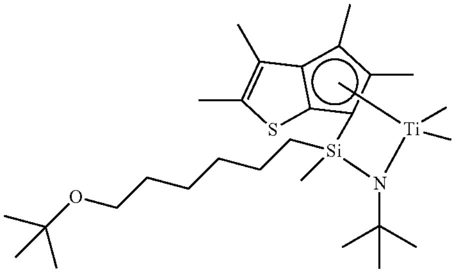

-continued (5c)

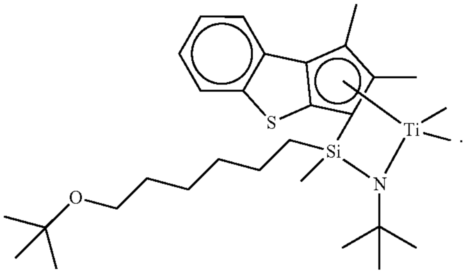

12. A method for preparing polyethylene comprising polymerizing ethylene monomers, in the presence of the metallocene-supported catalyst prepared by the method according to claim 1.

13. The method for preparing polyethylene according to claim 12, wherein the polyethylene satisfies the following requirements of (a1) to (a4):

(a1) a bulk density measured according to ASTM D1895-96 is 0.45 g/cc or less, (a2) a content of lines having particle sizes less than 75 μm is 1.3 wt % or less based on a total weight of polyethylene, (a3) an average particle size (D50) is 500 μm or more, and (a4) a SPAN value according to the following Mathematical Formula 1 is less than 1;

$$SPAN=(D90-D10)/D50$$ Mathematical Formula 1 wherein the Mathematical Formula 1, D90, D10 and D50 respectively mean particle sizes at the 90%, 10% and 50% points in cumulative particle volume distribution according to particle size, when analyzing particle size distribution of polyethylene particles by laser diffraction.

* * * * *